(12) United States Patent
Sudo et al.

(10) Patent No.: US 11,279,305 B2
(45) Date of Patent: Mar. 22, 2022

(54) VEHICLE

(71) Applicant: TOYOTA JIDOSHA KABUSHIKI KAISHA, Toyota (JP)

(72) Inventors: Junichi Sudo, Miyoshi (JP); Hiroyuki Arai, Toyota (JP); Koshi Yamada, Odawara (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 146 days.

(21) Appl. No.: 16/366,239

(22) Filed: Mar. 27, 2019

(65) Prior Publication Data

US 2019/0299887 A1 Oct. 3, 2019

(30) Foreign Application Priority Data

Apr. 3, 2018 (JP) .............................. JP2018-071689

(51) Int. Cl.

| | | |
|---|---|---|
| *B60R 16/06* | (2006.01) | |
| *B62D 37/02* | (2006.01) | |
| *H01T 19/00* | (2006.01) | |
| *H01T 4/02* | (2006.01) | |
| *H05F 3/04* | (2006.01) | |
| *H05F 3/00* | (2006.01) | |
| *H05F 1/02* | (2006.01) | |

(52) U.S. Cl.
CPC .............. *B60R 16/06* (2013.01); *B62D 37/02* (2013.01); *H01T 4/02* (2013.01); *H01T 19/00* (2013.01); *H05F 3/04* (2013.01); *H05F 1/02* (2013.01); *H05F 3/00* (2013.01)

(58) Field of Classification Search
CPC ........... B60R 16/06; B62D 37/02; H05F 3/04; H05F 1/02; H05F 3/00; H01T 4/02; H01T 19/00
USPC ......................................... 361/212, 218, 220
See application file for complete search history.

(56) References Cited

U.S. PATENT DOCUMENTS

| | | | | |
|---|---|---|---|---|
| 4,831,491 | A * | 5/1989 | Mueller ................. | B64D 45/02 244/1 A |
| 10,609,769 | B1 * | 3/2020 | Smith ..................... | B32B 27/08 |
| 2007/0014071 | A1 * | 1/2007 | Cann ...................... | B64D 45/02 361/220 |
| 2012/0021209 | A1 * | 1/2012 | Moncur .................. | B32B 27/08 428/336 |
| 2012/0327511 | A1 * | 12/2012 | Murakami ............... | G02B 1/14 359/483.01 |

(Continued)

FOREIGN PATENT DOCUMENTS

| | | |
|---|---|---|
| JP | 10-83891 A | 3/1998 |
| JP | 2003-226134 A | 8/2003 |

(Continued)

*Primary Examiner* — Danny Nguyen
(74) *Attorney, Agent, or Firm* — Sughrue Mion, PLLC

(57) ABSTRACT

The present disclosure provides a technology which can suppress separation of an airflow while a change in an appearance of a vehicle is suppressed.
This exemplary embodiment is a vehicle including a self-discharging static eliminator which neutralizes and eliminates positive charges generated on a vehicle body by self-discharging which causes negative air ions to be generated and a transparent conductive material, and the self-discharging static eliminator and the transparent conductive material are electrically continuous.

14 Claims, 25 Drawing Sheets

(56) References Cited

U.S. PATENT DOCUMENTS

| | | | |
|---|---|---|---|
| 2013/0192281 A1* | 8/2013 | Nam | B60H 1/3201 62/101 |
| 2015/0351207 A1* | 12/2015 | Tung | H01L 51/5253 345/30 |
| 2016/0031568 A1* | 2/2016 | Yokoi | B64C 1/36 361/218 |
| 2016/0280162 A1 | 9/2016 | Yamada et al. | |
| 2016/0376025 A1* | 12/2016 | Bimanand | B05D 3/101 428/334 |

FOREIGN PATENT DOCUMENTS

| | | | |
|---|---|---|---|
| JP | 2004-229421 A | 8/2004 | |
| JP | 2006-088880 A | 4/2006 | |
| JP | 2008-273224 A | 11/2008 | |
| JP | 6168157 B2 | 7/2017 | |

* cited by examiner

VEHICLE

CROSS REFERENCE TO RELATED APPLICATIONS

The present application claims priority from Japanese patent application JP 2018-071689 filed on Apr. 3, 2018, the content of which is hereby incorporated by reference into this application.

BACKGROUND

Technical Field

The present disclosure relates to a vehicle.

Background Art

JP Patent Publication (Kokai) No. 2006-88880 A describes a vehicle on which an airflow separation reducing sheet having a surface formed with projections and recesses is attached to an exterior.

JP Patent Publication (Kokai) No. 2003-226134 A and JP Patent Publication (Kokai) No. 2008-273224 A describe vehicles in which a discharging needle connected to a high voltage device is provided in a duct or in a door trim through which air flows from an air conditioner into a cabin. They are configured to supply the air ionized by corona discharge generated from a distal end portion of the discharging needle into the cabin.

When the airflow separation reducing sheet as described in JP Patent Publication (Kokai) No. 2006-88880 A is attached to the exterior, the projections and recesses are formed on the outer surface of a vehicle body, and an appearance of the vehicle is damaged. Moreover, since the airflow separation reducing sheet described in JP Patent Publication (Kokai) No. 2006-88880 A is formed by silicon rubber, the airflow separation reducing sheet can be easily charged electrostatically during running. Thus, the air is likely to separate from the outer surface of the vehicle body by a repulsive force generated by an air ion and static electricity charged on the airflow separation reducing sheet.

Moreover, JP Patent Publication (Kokai) No. 2003-226134 A and JP Patent Publication (Kokai) No. 2008-273224 A describe a vehicle in which the air ion is supplied into the cabin. However, the inventions described in these gazettes do not pay attention to a relationship between the static electricity charged on the vehicle body and aerodynamic characteristics of the air flowing on the surface of the vehicle body. Thus, since the air is usually charged with positive charges, if the vehicle body is charged with the positive static electricity, the repulsive force (repulsion force) caused by the static electricity acts between the air flow and the vehicle body, and the airflow is likely to separate from the vicinity of the outer surface of the vehicle body by the repulsive force.

When the airflow separates from the outer surface of the vehicle body as above, intended aerodynamic characteristics cannot be gained, and running performances or manipulation stability and the like are likely to lower.

Thus, JP Patent No. 6168157 discloses a vehicle including a self-discharging static eliminator which neutralizes and eliminates positive charges by self-discharging on a specific portion having a separation shape where the positively charged airflow flowing around the vehicle body during running begins to change from the flow along the surface of the vehicle body to a flow separated from the surface. JP Patent No. 6168157 describes that the technology can suppress separation of the airflow charged with the positive charges from the outer surface of the vehicle body due to charges on the vehicle body charged with the positive static electricity.

SUMMARY

As the technology described in JP Patent No. 6168157, the separation of the airflow can be suppressed by disposing the self-discharging static eliminator which neutralizes and eliminates the positive charges by self-discharging on the vehicle body, and as a result, the manipulation stability of the vehicle can be improved. However, although the more the self-discharging static eliminators are disposed on the vehicle, the more easily the separation of the airflow can be suppressed, if too many self-discharging static eliminators are used, the appearance of the vehicle is likely to be impaired. Thus, development of a technology that can suppress the separation of the airflow while a change in the appearance of the vehicle is suppressed has been in demand.

Thus, the present disclosure provides a technology that can suppress separation of an airflow while a change in an appearance of a vehicle is suppressed.

Then, the inventors found that by disposing a transparent conductive material on a vehicle body and by causing the conductive material to be electrically connected with a self-discharging static eliminator, positive charges generated on the vehicle body can be neutralized and eliminated by the self-discharging static eliminator while a change in an appearance of the vehicle is suppressed.

Aspect examples of the exemplary embodiment are as follows:

(1) A vehicle including a self-discharging static eliminator which neutralizes and eliminates positive charges generated on a vehicle body by self-discharging which generates negative air ions and a transparent conductive material, in which the self-discharging static eliminator and the transparent conductive material are electrically continuous.

(2) The vehicle described in (1), in which the transparent conductive material is disposed at least on a part of a portion which can be visually recognized from an outside of the vehicle.

(3) The vehicle described in (2), in which the transparent conductive material is disposed at least on a part of an outer surface of the vehicle.

(4) The vehicle described in any one of (1) to (3), in which the transparent conductive material is disposed on a surface of an insulating member constituting a part of the vehicle.

(5) The vehicle described in (4), in which the insulating member is a glass member.

(6) The vehicle described in (5), in which the glass member is a window glass or a glass for light.

(7) The vehicle described in (4), in which the insulating member is a resin member.

(8) The vehicle described in any one of (1) to (7), in which the self-discharging static eliminator is disposed at least on a part of a portion which cannot be visually recognized from the outside of the vehicle.

(9) The vehicle described in any one of (1) to (8), in which the self-discharging static eliminator neutralizes and eliminates, by self-discharging, positive charges in at least one of specific portions having a separation shape where an airflow positively charged and flowing around the vehicle body during running begins to change from a flow along a surface of the vehicle body to a flow separated from the surface of the vehicle body.

(10) The vehicle described in any one of (1) to (9), in which the self-discharging static eliminator is a charging suppression member including a conductive metal material having a corner part which causes the self-discharging to be generated.

(11) The vehicle described in any one of (1) to (10), in which the self-discharging static eliminator and the transparent conductive material are electrically continuous by being in direct contact with each other.

(12) The vehicle described in any one of (1) to (10), in which the self-discharging static eliminator and the transparent conductive material are electrically continuous by being in indirect contact through the conductive member.

(13) The vehicle described in any one of (1) to (12), in which the transparent conductive material is an ion liquid, a conductive polymer or a metal organic framework.

According to the disclosure, a technology which can suppress separation of an airflow while a change in an appearance of a vehicle is suppressed can be provided.

BRIEF DESCRIPTION OF THE DRAWINGS

FIGS. 10A to 10B are views illustrating a state where a self-discharger is attached to an outer surface of the vehicle body, in which FIG. 10A is a sectional view thereof and FIG. 10B is a plan view thereof;

FIGS. 11A to 11B are views illustrating a state where the self-discharger is attached to a back surface on a side opposite to the outer surface of the vehicle body, in which FIG. 11A is a sectional view thereof, and FIG. 11B is a plan view thereof;

FIGS. 12A to 12B are perspective views of the vehicle for explaining positions where the self-dischargers are disposed, in which FIG. 12A is a perspective view of the vehicle when seen from diagonally front and FIG. 12B is a perspective view of the vehicle seen from diagonally rear;

FIGS. 13A to 13B are views for explaining positions where the self-dischargers are attached to the outer surface on a lower part of a windshield and a surface on a side opposite to the outer surface on a rear end part of an engine hood so that the airflow around the vehicle body does not hit, in which FIG. 13A is a perspective view of the vehicle when seen from diagonally front and FIG. 13B is a sectional view illustrating a position where the self-discharger is attached;

FIGS. 15A to 15B are sectional views for explaining a position where the self-discharger is attached to a ceiling, in which FIG. 15A is a sectional view illustrating an example in which the self-discharger is attached to an indoor roof liner so that potential of the ceiling is lowered through the indoor roof liner and an air layer and FIG. 15B is a sectional view illustrating an example in which the self-discharger is attached to the indoor roof liner so that the potential of the ceiling is lowered by lowering the potential of the indoor roof liner in contact with the ceiling;

FIGS. 16A to 16B are views for explaining a position where the self-discharger is attached to the outer surface on the lower part of a rear glass so that the airflow around the vehicle body does not hit directly in a sedan type vehicle, in which FIG. 16A is a perspective view of the vehicle when seen from diagonally rear and FIG. 16B is a sectional view illustrating a position where the self-discharger is attached;

FIGS. 17A to 17B are views for explaining a position where the self-discharger is attached to the outer surface on the upper part of a rear back door glass and a rear end on a center part in a width direction of a rear spoiler where the airflow around the vehicle body separates so that the airflow around the vehicle body does not directly hit in a hatchback type vehicle, in which FIG. 17A is a perspective view of the vehicle when seen from diagonally rear, and FIG. 17B is a sectional view illustrating a position where the self-discharger is attached;

FIGS. 18A to 18B are views illustrating a position where the self-discharger is attached to the outer surface on the upper part of a rear back door glass and the rear end on the center part in a width direction of the rear spoiler where the airflow around the vehicle body separates so that the airflow around the vehicle body does not directly hit in a one-box type vehicle, in which FIG. 18A is a perspective view of the vehicle when seen from diagonally rear, and FIG. 18B is a sectional view illustrating a position where the self-discharger is attached;

FIGS. 20A to 20B are views illustrating a position where the self-discharger is attached to an undercover, in which FIG. 20A is a plan view of the undercover seen from a lower side of the vehicle, and FIG. 20B is a sectional view illustrating a position where the self-discharger is attached;

FIGS. 21A to 21B are views illustrating a position where the self-discharger is attached to a rear diffuser, in which FIG. 21A is a perspective view of the rear diffuser when seen from the lower side of the vehicle, and FIG. 21B is a sectional view illustrating a position where the self-discharger is attached;

DETAILED DESCRIPTION

Figure 1:
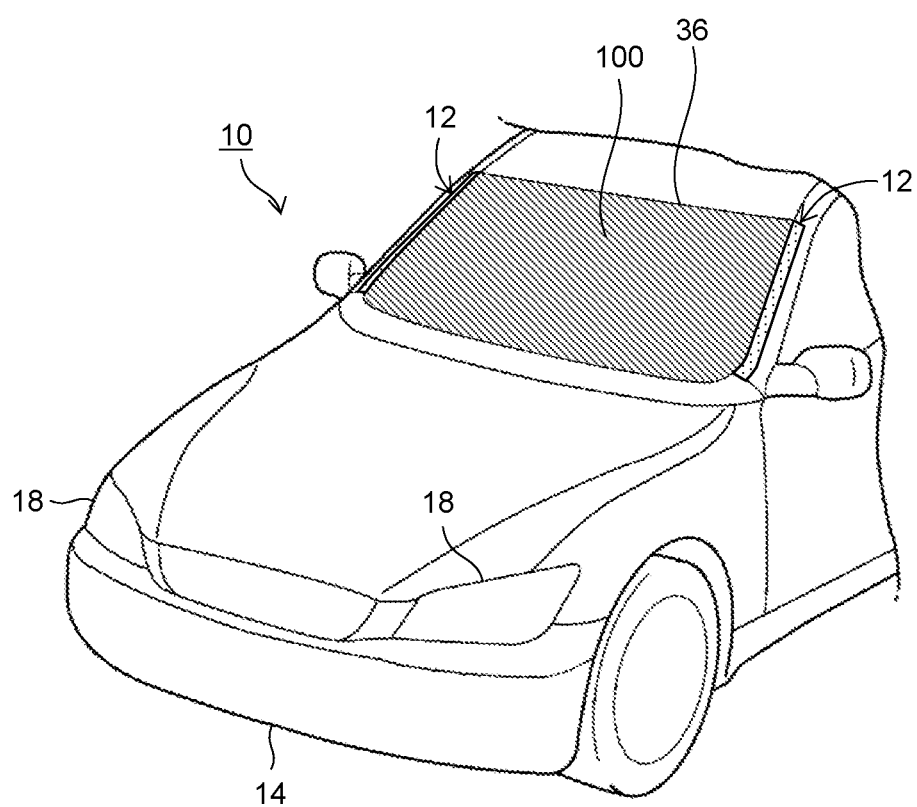
FIG. 1 is a perspective view for explaining a form of a vehicle according to an exemplary embodiment.

The exemplary embodiment is a vehicle including a self-discharging static eliminator which neutralizes and eliminates positive charges generated on a vehicle body by self-discharging which generates negative air ions and a transparent conductive material, in which the self-discharging static eliminator and the transparent conductive material are electrically continuous.

The vehicle according to the exemplary embodiment includes the self-discharging static eliminator which neutralizes and eliminates the positive charges generated on the vehicle body by self-discharging which generates the negative air ions. Neutralizing and eliminating the positive charges generated on the vehicle can suppress separation of the airflow positively charged and flowing around the vehicle body from the surface of the vehicle body during running of the vehicle. If the separation of the airflow from the vehicle body surface can be suppressed, deterioration of aerodynamic characteristics of the vehicle body, which is caused by a change of air pressure acting on a surface of the vehicle body beyond assumption, can be suppressed. As a result, running performances such as manipulation stability can be improved. Moreover, the vehicle according to the exemplary embodiment includes the transparent conductive material electrically continuous to the self-discharging static eliminator. The transparent conductive material has a function of carrying the positive charges generated on the vehicle body to the self-discharging static eliminator due to its conductivity. Moreover, the transparent conductive material does not largely change an appearance of the vehicle due to its transparency. Thus, by installing the transparent conductive material instead of the self-discharging static eliminator, the number of self-discharging static eliminators in use can be reduced, and as a result, the change in the appearance can be suppressed. Thus, the exemplary embodiment can provide a vehicle which can suppress the separation of the airflow while the change in the appearance of the vehicle is suppressed. The term "transparent" means that a rate of visible light transmission of 70% or more in some embodiments, means 80% or more in other embodiments, and means 90% or more in some other embodiments. More specifically, in some embodiments, the rate of visible light transmission in a wavelength 500 nm or 550 nm may be the above-mentioned rate of transmission or greater. In other embodiments, the rate of visible light transmission in an entire wavelength region from wavelengths of 0.4 to 0.8 μm may be the above-mentioned rate of transmission or greater.

In an aspect of the exemplary embodiment, the transparent conductive material is disposed at least on a part of a portion which can be visually recognized from an outside of the vehicle. Since the transparent conductive material does not largely affect an appearance of the vehicle, it can be installed on the vehicle without concerning about the change in the appearance. The portion which can be visually recognized from the outside of the vehicle, for example, includes an outer surface of the vehicle. The outer side of the vehicle means a vehicle surface exposed to the outside in a state where all the opening portions such as a door present in the vehicle are closed.

In an aspect of the exemplary embodiment, the transparent conductive material is disposed on a surface of an insulating member constituting a part of the vehicle. Since the insulating member is easily charged positively with static electricity and the positive charges do not move easily, a positive potential easily become high. In the exemplary embodiment, by disposing the transparent conductive material on the surface of the insulating member, the charges generated on the insulating member can be transferred to the self-discharging static eliminator, and then charging in the insulating member can be solved.

In an aspect of the exemplary embodiment, the insulating member is a glass member. If the self-discharging static eliminator is disposed on the glass member in order to solve the charging in the glass member, transparency of the glass member is lost. Thus, it may be undesirable to dispose the self-discharging static eliminator on the glass member in some embodiments. Thus, in the exemplary embodiment, the transparent conductive material is disposed on the glass member. As a result, the charges generated on the glass member can be transferred to the self-discharging static eliminator without losing transparency of the glass member, and charging in the glass member can be solved. The glass member includes a window glass or a glass for light, for example. Moreover, the window glass includes a windshield, a side glass, a rear glass and the like. The glass for light includes glass for head lamp, glass for small lamp, glass for blinker, glass for tail lamp, glass for brake lamp, glass for fog lamp and the like.

In an aspect of the exemplary embodiment, the insulating member is a resin member. The resin member as the insulating member is easily charged positively particularly with static electricity and the positive charges do not move easily. Thus, the resin member tends to have a higher positive potential. In the exemplary embodiment, by disposing the transparent conductive material on a surface of the resin member, the charges generated in the resin member can be transferred to the self-discharging static eliminator, and the charging in the resin member can be solved. The resin member includes a front bumper, a rear bumper, a side step, a fender arch, a rear wiper, a door knob, a head lamp cover, a small lamp cover, a blinker cover, a tail lamp cover, a brake lamp cover, a fog lamp cover, a door mirror, a fender mirror, a front bumper spoiler, a rear spoiler, a front grill and the like, for example.

In an aspect of the exemplary embodiment, the self-discharging static eliminator is disposed at least on a part of a portion which cannot be visually recognized from an outside of the vehicle. By disposing the self-discharging static eliminator on the portion which cannot be visually recognized from the outside of the vehicle, the charging generated on the vehicle can be solved with little influence on the appearance of the vehicle. In some embodiments, the transparent conductive member, which gives little influence on the appearance, is disposed on the portion which can be visually recognized from the outside of the vehicle. As a result, the charges on the portion which can be visually recognized from the outside of the vehicle can be solved by transferring the charges to the self-discharging static eliminator via the transparent conductive material, without giving a large change to the appearance of the vehicle. The portion which cannot be visually recognized from the outside of the vehicle is, for example, a rear surface of the member constituting the outer surface of the vehicle.

In an aspect of the exemplary embodiment, the self-discharging static eliminator neutralizes and eliminates, by self-discharging, the positive charges in at least one of specific portions having a separation shape where the airflow positively charged and flowing around the vehicle body during running begins to change from the flow along the surface of the vehicle body to a flow separated from the surface of the vehicle body. The separation of the airflow from the surface of the vehicle can be suppressed more effectively by neutralizing and discharging the positive charges in the specific portions having the separation shape. The exemplary embodiment includes not only an embodiment in which the self-discharging static eliminator directly solves the positive charges of the specific portion by neutralization and discharging but also an embodiment in which the positive charges of the specific portion are solved by transferring them to the self-discharging static eliminator via the transparent conductive material. In the embodiment in which the self-discharging static eliminator directly solves the positive charges of the specific portion by neutralization and discharging, the self-discharging static eliminator is disposed on the specific portion or in the vicinity thereof. In the embodiment in which the positive charges of the specific portion are solved by transferring them to the self-discharging static eliminator via the transparent conductive material, the transparent conductive material is disposed on the specific portion or in the vicinity thereof. In this case, the self-discharging static eliminator is disposed on the portion which cannot be visually recognized from the outside of the vehicle in some embodiments.

In an aspect of the exemplary embodiment, the self-discharging static eliminator is a charging suppression member containing a conductive metal material having a corner part which generates self-discharging. The charging suppression member has a conductive metal material having a sharp or pointed corner part which can generate so-called corona discharge depending on a potential. A material of the conductive metal material includes gold, silver, copper, aluminum and the like (that is, conductive metal), for example.

In an aspect of the exemplary embodiment, the self-discharging static eliminator and the transparent conductive material are electrically connected directly or indirectly. That is, in the one aspect of the exemplary embodiment, the self-discharging static eliminator and the transparent conductive material are electrically connected by being in direct contact. Moreover, in the one aspect of the exemplary embodiment, the self-discharging static eliminator and the transparent conductive material are electrically connected by being in indirect contact through the conductive member such as wiring. By allowing the self-discharging static eliminator and the transparent conductive material to be electrically connected through the conductive member such as wiring, restriction of arrangement (position) of the self-discharging static eliminator and the transparent conductive material can be reduced. The electric conduction only needs to ensure conductivity to such a degree that charges can be moved.

In an aspect of the exemplary embodiment, the transparent conductive material is an ion liquid, a conductive polymer or a metal organic framework. These materials can be installed easily on the vehicle.

The ion liquid is also called an ionic liquid or an ordinary temperature molten salt and is constituted by cations and anions. Examples of cations constituting the ion liquid include ammonium cations, imidazolium cations, pyridinium cations, pyrrolidinium cations, morpholinium cations, phosphonium cations, piperidinium cations, sulfonium cations and the like, but they are not limited to these. Among them, imidazolium cations, pyridinium cations, and ammonium cations are used in some embodiments. Imidazolium cations include dialkyl imidazolium cations, trialkyl imidazolium cations and the like and specifically include 1-ethyl-3-methyl imidazolium ion, 1-butyl-3-methyl imidazolium ion, 1,2,3-trimethyl imidazolium ion, 1,2-dimethyl-3-ethyl imidazolium ion, 1,2-dimethyl-3-propyl imidazolium ion, 1-butyl-2,3-dimethyl imidazolium ion and the like. Pyridinium cations include N-propyl pyridinium ion, N-butyl pyridinium ion, 1-butyl-4-methyl pyridinium ion, 1-butyl-2,4-dimethyl pyridinium ion and the like. In some embodiments, the ammonium cations have aliphatic and alicyclic 4 class ammonium ion as a cation component. The aliphatic or alicyclic 4 class ammonium ions include various 4 class alkyl ammonium ion such as trimethylpropyl ammonium ion, trimethylhexyl ammonium ion, tetrapentyl ammonium ion, diethylmethyl (2-methoxy ethyl) ammonium, diethylmethyl (2-methoxy ethyl) ammonium and the like.

Anions constituting the ion liquid include halogenated ions ($CF^-$, $Br^-$, $I^-$ and the like), $HNO_3^-$, $H_2PO_4^-$, $CH_3COO^-$, $CF_3COO^-$, $CH_3CO_2^-$, $CF_3CO_2^-$, $CH_3SO_3^-$, $CF_3SO_3^-$, $CH_3CH_2SO_3^-$, $SCN^-$, $BF_4^-$, $CiO_4^-$, $FeCl_4^-$, $PF_6^-$, $AsF_6^-$, $SbF_6^-$, $(CF_3SO_2)_2N^-$, $(CF_3CF_2SO_2)_2N^-$, $(FSO_2)_2N^-$, $(CF_3SO_2)_3C^-$, $Ph_4B^-$, $PF_3(C_2F_5)_3^-$, $CF_3BF_3^-$, $C(CN)_3^-$, $(NC)_2N^-$, $p\text{-}CH_3PhSO_3^-$, $PF_3(C_2F_5)_3^-$, $(CH_3)_2PO_4^-$, $AlCl_4^-$, $HSO_4^-$, $ClO_4^-$, but they are not limited to these.

The ion liquids include 1-ethyl-3-methyl imidazolium trifluoromethane sulfonate in some embodiments. Commercial products of the ion liquid include EMI-TF and the like by Toyo Gosei Co., Ltd., for example.

One kind of the ion liquid may be used singularly or two kinds or more may be used in combination.

The ion liquid can be applied on an arbitrary portion of the vehicle, thereby disposing the transparent conductive material on the vehicle. Moreover, the ion liquid may be applied on an arbitrary portion of the vehicle in a state mixed with a solvent.

As the conductive polymer, polymers having conductivity can be used without particular limitation. The conductive polymers include polymers having a π-electron conjugated system along a principal chain of a molecule. The polymer having the π-electron conjugated system includes a polyacetylene system, a polyacene system, a polyaromaticvinylene system, a polypyrrole system, a poly aniline system, a polythiophene system and the like. One kind of the conductive polymer may be used singularly or two kinds or more may be used in combination.

The conductive polymer can be disposed on the vehicle by allowing it to adhere to an arbitrary position of the vehicle in a form of a film containing a conductive polymer layer, for example. An adhesive layer used for the adhesion has conductivity in some embodiments. Moreover, the conductive polymer can be disposed on the vehicle by being applied on an arbitrary position of the vehicle in a form of a polymer solution containing the conductive polymer and the solvent and then dried. Moreover, the conductive polymer can be disposed on the vehicle by applying a monomer solution containing a monomer of the conductive polymer on an arbitrary position of the vehicle and hardening it, for example. The conductive polymer film includes Teonex (product name) by Teijin Limited, for example.

A metal organic framework (MOF) is a crystalline framework having a polymer structure formed in combination of metal ions and a cross-linking organic ligand connecting them.

The metal ions forming the metal organic framework include metal ions of transition metal or typical metal. In some embodiment, the metal ions are metal ions of the transition metal or groups 2, 13, and 14 typical metals. The metal ion is at least one kind of metal ion selected from a group consisting of copper, zinc, cadmium, silver, cobalt, nickel, iron, ruthenium, aluminum, chrome, molybdenum, manganese, palladium, rhodium, zirconium, titanium, and magnesium in some embodiments, at least one kind of metal ion selected from a group consisting of copper, zinc, silver, cobalt, nickel, iron, and aluminum in other embodiments, and a copper ion or a zinc ion in some other embodiments. A valence of the metal ion is not particularly limited but it is 1 to 6 in some embodiments, and 1 to 3 in other embodiments.

The organic ligands forming the metal organic framework include cross-linking organic ligands.

Compounds as the organic ligand forming the metal organic framework include compounds having at least two ligand groups in some embodiments. In other embodiments, the compounds forming the organic ligands include compounds having a ring with ligand nitrogen atoms in the ring and at least two ligand nitrogen atoms, compounds having one ring with a ligand nitrogen atom in the ring and one carboxyl group, and a compound having at least two carboxyl groups. In some other embodiments, the compounds forming the organic ligands include compounds having a ring with ligand nitrogen atoms in the ring and at least two ligand nitrogen atoms, and compounds having at least two carboxyl groups.

The ligand group(s) contained in the organic ligand is not particularly limited as long as it can coordinate to the metal ion. In some embodiments, the ligand group includes a ligand nitrogen atom in an aliphatic ring, a ligand nitrogen atom in an aromatic ring, a carboxyl anion, and a carboxyl group, In other embodiments, the ligand group includes a ligand nitrogen atom in an aromatic ring, carboxyl anion, and a carboxyl group. In some other embodiments, the ligand group includes a ligand nitrogen atom in an aromatic ring, and a carboxyl anion.

One kind of the compound having at least two ligand groups forming the metal organic framework may be used singularly or two kinds or more may be used in combination.

Moreover, as the compound having the metal ion and at least two ligand groups forming the metal organic framework, those described in Chem. Rev., 2012, 112, 933-969, Science, vol. 319, 939-943 (2008) and Angew. Chem. Int. Ed., 2004, 43, 2334-2375, for example, can be used.

The metal organic frameworks include, for example, $\{[Co_2(4,4'\text{-bpy})_3(NO_3)_4].4H_2O\}_n$, $\{[Cu_2(pzdc)_2(pz)].2H_2O\}_n$(CPL-1), $\{[M_2(dca)_2(4,4'\text{-bpy})_2].solvent\}$, $\{Zn_4O(bdC)_3(DMF)_8(C_6H_5Cl)\}_n$(MOF-5) and the like.

The metal organic framework may include a crystal size adjusting agent as another organic compound. One kind of the crystal size adjusting agent forming the metal organic framework may be used singularly or two kinds or more may be used in combination.

In some embodiments, a layer containing the metal organic framework is a layer formed on a surface of a constituent member of the vehicle to which a single layer and/or a multilayer of the metal organic framework particles adhere.

With regard to formation of the MOF layer, a layer containing the metal organic framework can be formed by allowing a composition containing at least one compounds selected from a group consisting of metal hydroxides and metal salts of inorganic acids or organic acids, a compound having at least two ligand groups, and a solvent to be brought into contact with the surface of the constituent member of the vehicle.

As described above, the self-discharging static eliminator and the transparent conductive material may be electrically connected by being in direct contact, or the self-discharging static eliminator and the transparent conductive material may be electrically connected indirectly through a conductive member such as wiring. The conductive member which electrically connects the self-discharging static eliminator and the transparent conductive material includes a wiring, for example, but not particularly limited to this. The wiring may be a conductor or a metal solid film formed on an arbitrary member, but not particularly limited to these. A shape of the wiring is not particularly limited and may be a desired shape. The conductive member only needs to be a member which can ensure electric continuity between the self-discharging static eliminator and the transparent conductive material. In some embodiments, the conductive member is an exterior component, for example.

Metals which can be used for the wiring are metal with high conductivity in some embodiments. Examples of them include copper, aluminum, titanium, molybdenum, silver, chrome, manganese, iron, nickel, zinc, tungsten, palladium, platinum, gold or their alloys, for example.

The exemplary embodiment will be described below on the basis of the drawings.

FIG. 1 is a perspective view illustrating a form of the exemplary embodiment. In a vehicle 10 illustrated in FIG. 1, a self-discharging static eliminator 12 is disposed along frames on both sides of a windshield 36. The self-discharging static eliminator 12 illustrated in FIG. 1 is a film-shaped charging suppression member containing a conductive metal material having a corner part which generates self-discharging. The charging suppression member includes a conductive adhesive layer so that the conductive metal material can be attached to a predetermined portion by the conductive adhesive layer. Moreover, in FIG. 1, a transparent conductive material 100 is disposed on the whole surface on the outer surface of the windshield 36. The self-discharging static eliminator 12 is disposed so that end portions thereof are overlapped with the windshield 36 by several millimeters. Thus, the transparent conductive material 100 and the self-discharging static eliminator 12 are in direct contact and are electrically continuous.

A glass member such as the windshield 36 is an insulating member and can be charged easily with static electricity, and charges do not move easily. In order to solve the charging in the glass member, the self-discharging static eliminator can be disposed on the glass member. However, if the self-discharging static eliminator is disposed on the glass member, transparency of the glass member is lost, which is not desirable. Thus, as in the embodiment illustrated in FIG. 1, the transparent conductive material electrically connected with the self-discharging static eliminator is disposed on the glass member. As a result, the charges generated in the glass member can be transferred to the self-discharging static eliminator without losing the transparency of the glass member, and the charging in the glass member can be solved. As a result, separation of the airflow in a portion of the glass member from the surface thereof can be suppressed while transparency of the glass member is ensured.

When the transparent conductive material is disposed on the glass member, visible light transmission of a laminated body of the transparent conductive material and the glass member such as the windshield should satisfy the legal standard in Article 28 of Road Trucking Vehicle Act.

Figure 2:
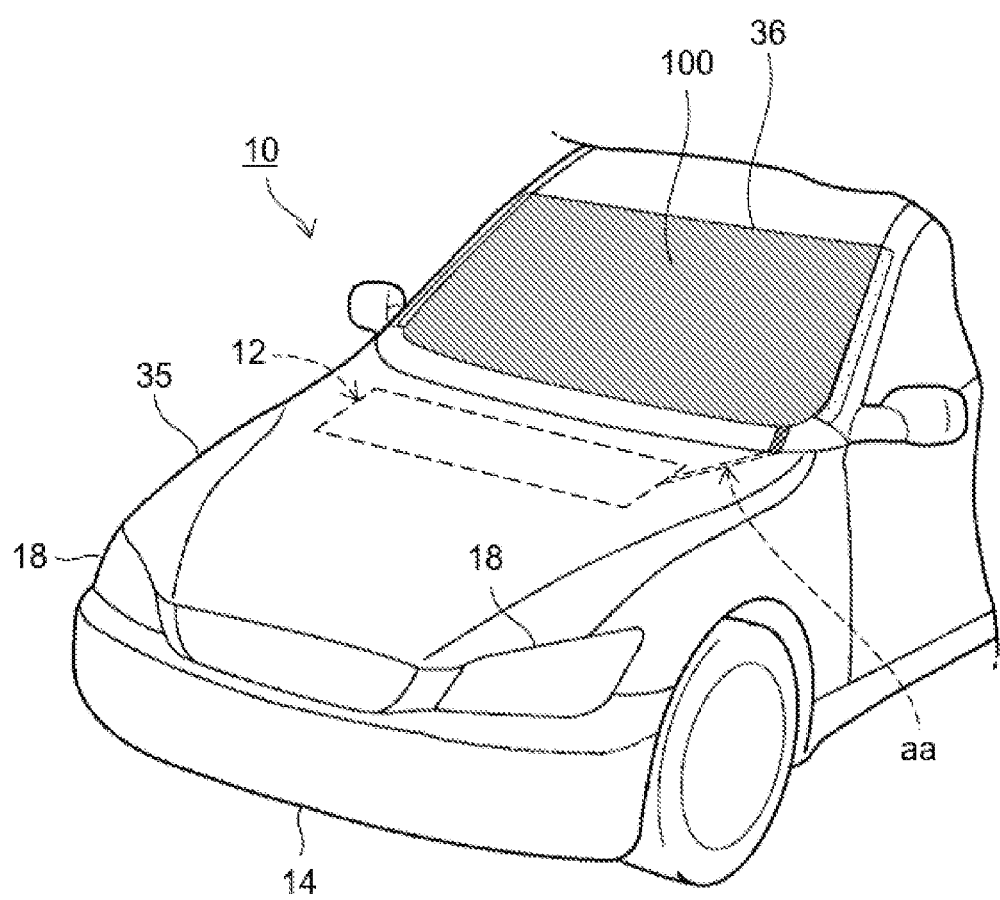
FIG. 2 is a perspective view for explaining a form of the vehicle according to the exemplary embodiment.

FIG. 2 is a perspective view illustrating one exemplary embodiment. In the vehicle 10 illustrated in FIG. 1, a film-shaped charging suppression member containing a conductive metal material having a corner part which generates self-discharging is disposed on an inner surface of an engine hood 35 as the self-discharging static eliminator 12. The inner surface of the engine hood is a portion which cannot be visually recognized from an outer side of the vehicle when the engine hood 35 is closed. In the embodiment illustrated in FIG. 2, similarly to the embodiment illustrated in FIG. 1, the transparent conductive material 100 is disposed on the whole surface of the outer surface of the windshield 36. The transparent conductive material 100 and the self-discharging static eliminator 12 are electrically connected through wiring aa.

In the embodiment illustrated in FIG. 2, as in the embodiment illustrated in FIG. 1, the charges generated in the glass member can be transferred to the self-discharging static eliminator, thereby can solve the charging in the glass member without losing transparency of the glass member. As a result, the separation of the airflow on the portion of the glass member can be suppressed while transparency of the glass member is ensured.

Figure 3:
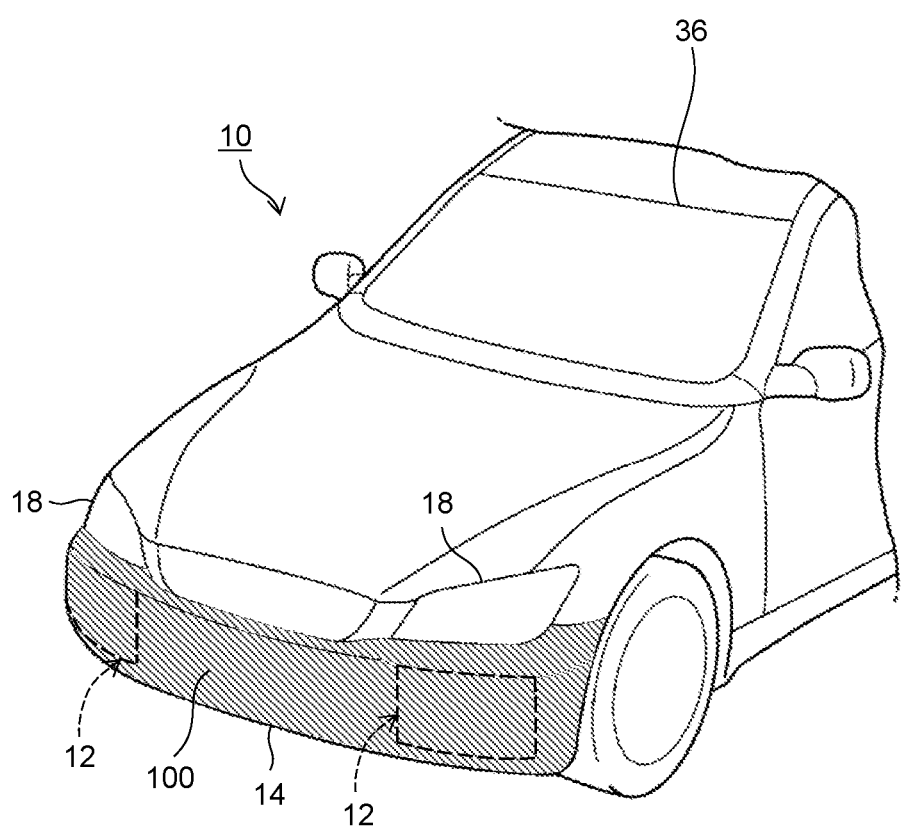
FIG. 3 is a perspective view for explaining a form of the vehicle according to the exemplary embodiment.

FIG. 3 is a perspective view illustrating one exemplary embodiment. In the vehicle 10 illustrated in FIG. 3, the film-shaped charging suppression member containing the conductive metal material having the corner part which generates self-discharging is disposed on the inner surface of a bumper cover 14 positioned in a front side of the vehicle as the self-discharging static eliminator 12. The inner surface of the bumper cover is a portion which cannot be visually recognized from the outside of the vehicle when the bumper cover 14 is attached to the vehicle body. In FIG. 3, the transparent conductive material 100 is disposed on the whole surface of both the outer surface and the inner surface of the bumper cover 14. Moreover, the transparent conductive material 100 is disposed on the whole of the inner surface of the bumper cover 14, and the self-discharging static eliminator 12 is disposed on the transparent conductive material 100. Thus, the transparent conductive material 100 and the self-discharging static eliminator 12 are in direct contact and electrically continuous.

The bumper cover 14 is a resin member, and the resin member as the insulating member can be easily charged with static electricity, and charges do not move easily. Thus, as in the embodiment illustrated in FIG. 3, the transparent conductive material electrically connected with the self-discharging static eliminator is disposed on the resin member. The charges generated in the resin member can be transferred to the self-discharging static eliminator, and the charging in the resin member can be solved. As a result, the separation of the airflow on the portion of the resin member can be suppressed. Moreover, a change in the appearance can be suppressed by disposing the transparent conductive material on the resin member instead of the self-discharging static eliminator.

In some embodiments, the transparent conductive material 100 is disposed on the outer surface of the bumper cover, the self-discharging static eliminator 12 is disposed on the inner surface of the bumper cover or on a component other than the bumper cover, and they are electrically connected through the wiring, for example.

Figure 4:
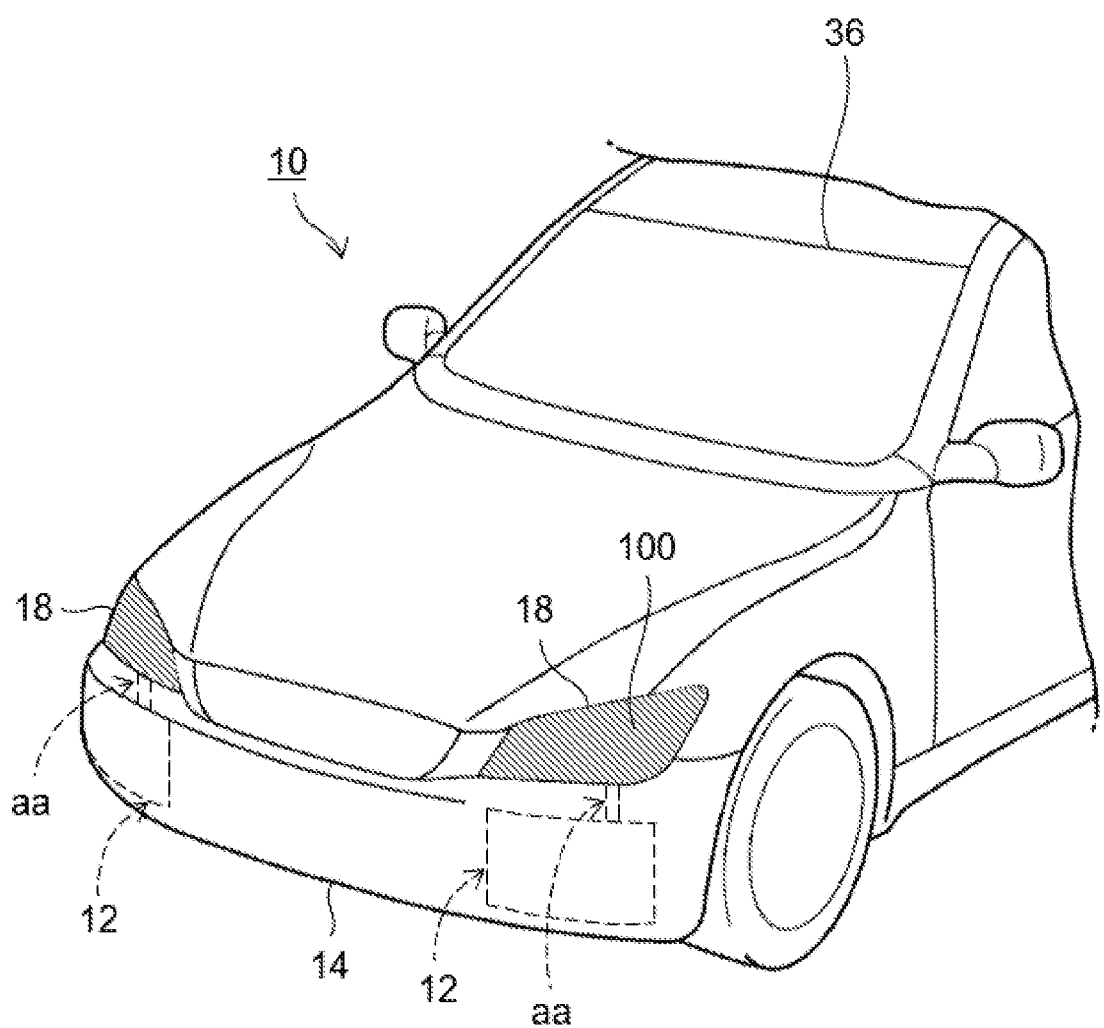
FIG. 4 is a perspective view for explaining a form of the vehicle according to the exemplary embodiment.

FIG. 4 is a perspective view illustrating the embodiment of the exemplary embodiment. In the vehicle 10 illustrated in FIG. 4, the film-shaped charging suppression member containing the conductive metal material having the corner part which generates self-discharging as the self-discharging static eliminator 12 is disposed on the inner surface of the bumper cover 14 on the vehicle front side. In FIG. 4, the transparent conductive material 100 is disposed on the whole of the outer surface of a head lamp 18. The transparent conductive material 100 and the self-discharging static eliminator 12 are electrically connected through the wiring aa.

In the embodiment illustrated in FIG. 4, as in the embodiments illustrated in FIGS. 1 and 2, the charges generated in the glass member can be transferred to the self-discharging static eliminator, thereby can solve the charging in the glass member without losing transparency of the glass member. As a result, the separation of the airflow on the portion of the glass member can be suppressed.

Figure 5:
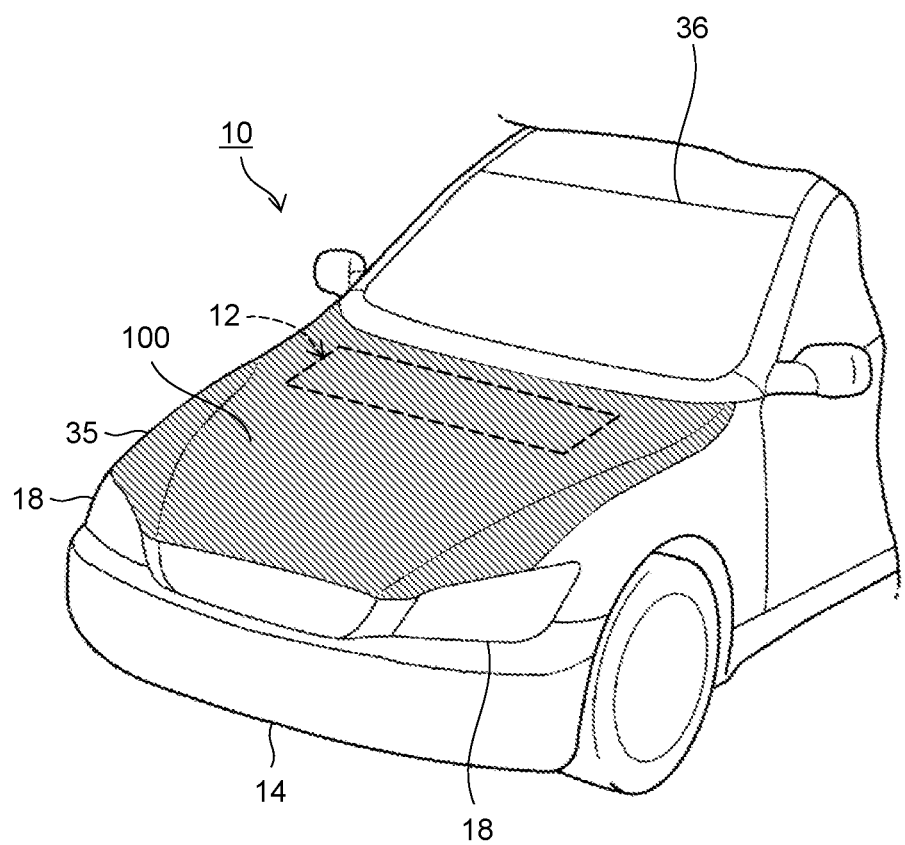
FIG. 5 is a perspective view for explaining a form of the vehicle according to the exemplary embodiment.

FIG. 5 is a perspective view illustrating one exemplary embodiment. In the vehicle 10 illustrated in FIG. 1, the film-shaped charging suppression member containing the conductive metal material having the corner part which generates self-discharging is disposed on the inner surface of an engine hood 35 as the self-discharging static eliminator 12. In FIG. 5, the transparent conductive material 100 is disposed on the whole of both the outer surface and the inner surface of the engine hood 35. Moreover, the transparent conductive material 100 is disposed on the whole of the inner surface of the engine hood, and the self-discharging static eliminator 12 is disposed on the transparent conductive material 100. Thus, the transparent conductive material 100 and the self-discharging static eliminator 12 are in direct contact and electrically connected with each other. The charges generated on the engine hood 35 can be transferred to the self-discharging static eliminator, thereby solve the charging in the resin member. As a result, the separation of the airflow on the portion of the resin member can be suppressed.

The engine hood 35 is constituted mainly by a metal material, but polymer coating or glass coating is applied on the metal material in some cases. Thus, there is a case where charges cannot move easily even in the member constituted mainly by the metal material in some cases. Therefore, by disposing the transparent conductive material 100 on such member, the generated charges can be transferred to the self-discharging static eliminator to solve the charging. As a result, the separation of the airflow can be suppressed. Moreover, disposing the transparent conductive material instead of the self-discharging static eliminator can suppress a change in the appearance.

In some embodiments, the transparent conductive material 100 is disposed on the outer surface of the engine hood 35, the self-discharging static eliminator 12 is disposed on the inner surface of the engine hood 35 or on a component other than the engine hood, and they are electrically connected through the wiring.

In the following, the self-discharging static eliminator will be described by referring to the drawings, and an effect which can be obtained by charge elimination will be described. In the following description, the description on the transparent conductive material will be omitted in some cases, but the exemplary embodiment is not limited to the embodiment described in the following. Moreover, in the following, an arrangement example of the self-discharging static eliminator is mainly illustrated, but the arrangement example of the self-discharging static eliminator can be grasped as an example illustrating an arrangement position of the transparent conductive material.

The self-discharging static eliminator can neutralize and eliminate the positive charges generated on the vehicle body by self-discharging which generates the negative air ion. The repulsive force (repulsion force) generated between the airflow and the vehicle body charged positively can be lowered by reducing static electricity charged on the surface of the vehicle body to lower the positive potential. Thus, the separation of the airflow charged positively from the surface of the vehicle body can be suppressed. As a result, deterioration of the aerodynamic characteristics of the vehicle body, which is caused by a change of an air pressure acting on the surface of the vehicle body beyond assumption, can be suppressed, and thus the running performances such as manipulation stability can be improved. In some embodiments, as described above, the self-discharging static eliminator neutralizes and eliminates, by self-discharging, positive charges in at least one of specific portions having the separation shape where the airflow charged positively and flowing around the vehicle body during running begins to change from the flow along the surface of the vehicle body to the flow separated from the surface of the vehicle body. The arrangement of the self-discharging static eliminator is not particularly limited.

Moreover, by providing the self-discharging static eliminator, which performs self-discharging depending on electrostatic energy of positive charges, on the specific portion(s) having the separation shape where the airflow charged with the positive charges begins to change from the flow along the surface of the vehicle body to the flow separated from the surface, the static electricity around the specific portion of the vehicle body can be electrically neutralized and eliminated. Thus, the repulsion force is not generated easily between the surface of the positively charged vehicle body and the airflow charged with the positive charges, the airflow around the specific portion of the vehicle body is not separated easily, and disturbance in the airflow can be reduced. As a result, air resistance of the vehicle is reduced, vibration of the vehicle caused by the disturbance of the airflow is suppressed, and then manipulation stability of the vehicle can be improved. Moreover, in the exemplary embodiment, the transparent conductive material is disposed on the specific portion instead of the self-discharging static eliminator in some cases. By disposing the transparent conductive material instead of the self-discharging static eliminator, a change in the appearance can be suppressed.

As described above, the self-discharging static eliminator is not particularly limited as long as it is a device, a component or a member having a function of generating self-discharging, but a charging suppression member containing the conductive metal material having a corner part which generates self-discharging can be used in some cases. The self-discharging static eliminator is disposed so that at least its discharging portion is in contact with the air. The charging suppression member can be constituted by a film of a conductive metal material having a sharp or a pointed corner part which generates self-discharging, for example. By using such charging suppression member as the self-discharging static eliminator, a mass increase of the vehicle can be suppressed.

Moreover, as described above, the self-discharging static eliminator such as the charging suppression member is disposed on a portion which cannot be visually recognized from the outside of the vehicle from a viewpoint of the appearance in some cases. Specifically, by providing it on a rear surface exposed to the airflow flowing on the side opposite to the outer surface of the vehicle, the appearance is not impaired.

Figure 6:
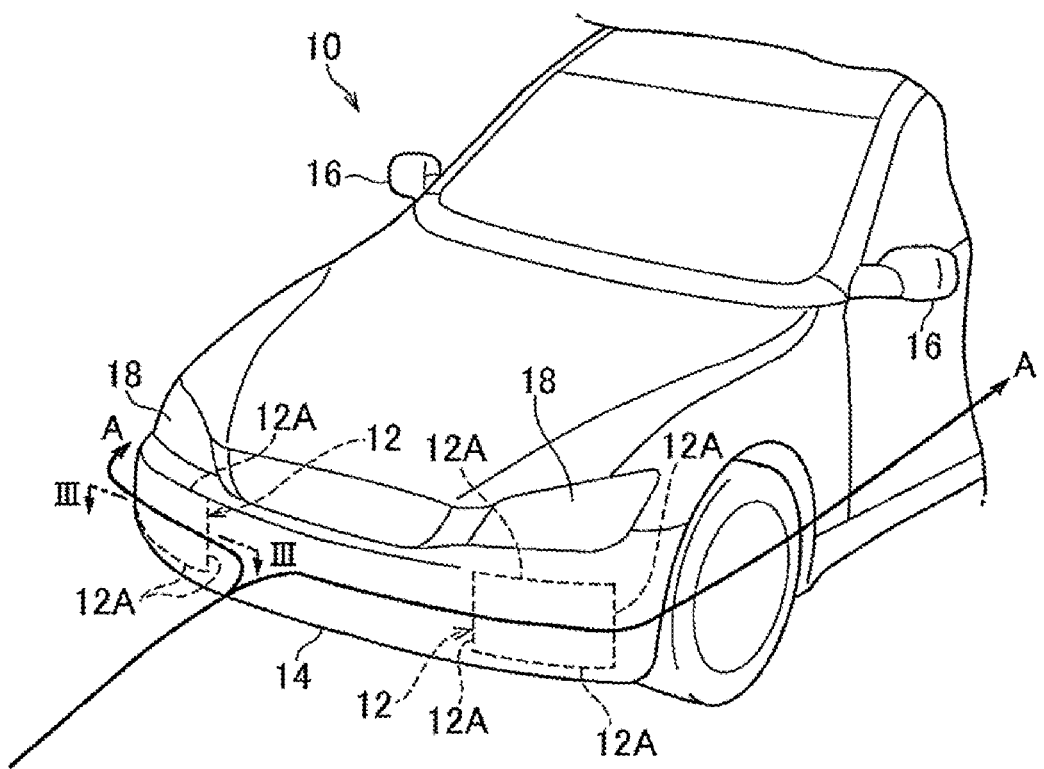
FIG. 6 is a perspective view illustrating a front half part of the vehicle.

In the vehicle 10 illustrated in FIG. 6, a conductive film 12 which is the self-discharging static eliminator is attached to the inner surface (also referred to as the rear surface) of the exterior component constituting vehicle 10, which is the opposite side to the outer surface of the specific portion where the airflow separates from the surface of the vehicle.

This conductive film 12 corresponds to the aforementioned charging suppression member. The phrase that "airflow separates" means that the flow of the air along the surface of the vehicle body changes to the flow of the air separated from the surface of the vehicle body. The separation of the airflow occurs mainly at a portion where an outer surface of the vehicle body is bent to the inner side when the vehicle body is seen from the front, for example. Specifically, in both of the right and left sides of the vehicle body, the separation of the airflow occurs at a portion bent so that a vehicle width is narrowed. Moreover, in the engine hood or a roof, the separation of the airflow occurs at the portion bent so that its height is lowered. Moreover, in a lower surface of the vehicle body such as the undercover, the separation of the airflow occurs at a portion bent so that a vehicle height changes from a portion gradually lowered toward the rear of the vehicle to the horizontal or a portion bent so that the vehicle height gradually increases from the portion horizontal toward the rear of the vehicle. Moreover, the separation of the airflow occurs at a portion partially protruding to an outside of the vehicle body or a stepped portion.

The exterior components of the vehicle 10 in the example illustrated in FIG. 6 are portions which can be charged with positive charges easily due to internal factors such as the airflow around the vehicle, repetition of contacts and separations between an outer surface of a tire and a road surface, and the like or external factors such as charges from the outside and the like. The exterior components include the bumper cover 14 on the vehicle front side, the door mirror 16, the head lamp 18, the door knob, the tail lamp, an antenna fin, the side door comprised of a resin, a back door comprised of a resin and the like. These exterior components are resin members which are positively charged easily with static electricity, and as a result, the positive potentials become high. In some embodiments, the conductive film 12 having the sharp corner part which can act as the self-discharging static eliminator is provided on the specific portion of these resin-type exterior components. In other embodiments, the transparent conductive material is provided on the specific portion of these resin-type exterior components.

Figure 7A:
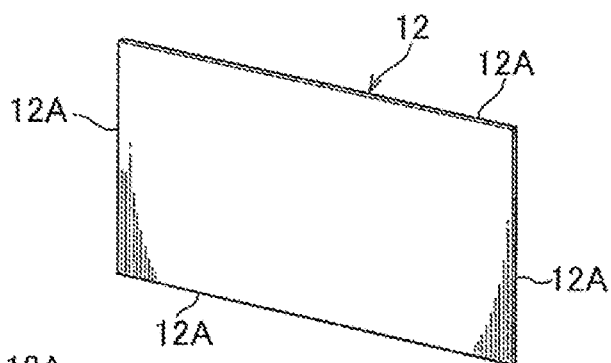
FIGS. 7A to 7D are perspective views illustrating conductive films on which various corner parts are formed.

As illustrated in FIGS. 6 and 7A, in the exemplary embodiment, the conductive film 12 is provided on the inner side of the vehicle of the bumper cover 14 which is an example of the exterior component. Specifically, the conductive film 12 is provided on the rear surface of the specific portion in the bumper cover 14 in the vicinity of both ends in the vehicle width direction having a shape where the separation of the airflow can easily occur. Moreover, the conductive film 12 is provided one each on symmetrical positions with respect to the center in the vehicle width direction. A material of this bumper cover 14 may be acrylonitrile-butadiene-styrene copolymer synthetic resin (ABS resin), for example.

This conductive film 12 is formed having a rectangular shape, for example, and has a sharp corner part 12A on an outer edge portion or an outer peripheral wall surface so that so-called corona discharge is generated depending on the potential of the conductive film 21. Specifically, the corner part 12A is formed to be sharp or pointed, so that the charges are concentrated and self-discharging can occur easily. In an example illustrated in FIG. 7A, the corner parts are sharp edges on four sides or pointed top portions at four corners or their side wall surfaces in the rectangular conductive film 12. As a material of the conductive film 12, gold, silver, copper, aluminum (that is, conductive metal) can be used. In some embodiments, when aluminum is used, oxidization preventing treatment is applied to the conductive film 12 in order to suppress lowering of conductivity by oxidization. The conductive film 12 may be an adhesive tape comprised of a conductive metal foil and a conductive adhesive. The conductive film 12 may be obtained by cutting a conductive aluminum foil tape or the like so that the sharp or pointed corner parts 12A are formed on the outer edge portion or the outer peripheral wall surface so that corona discharge generates.

Figure 8:
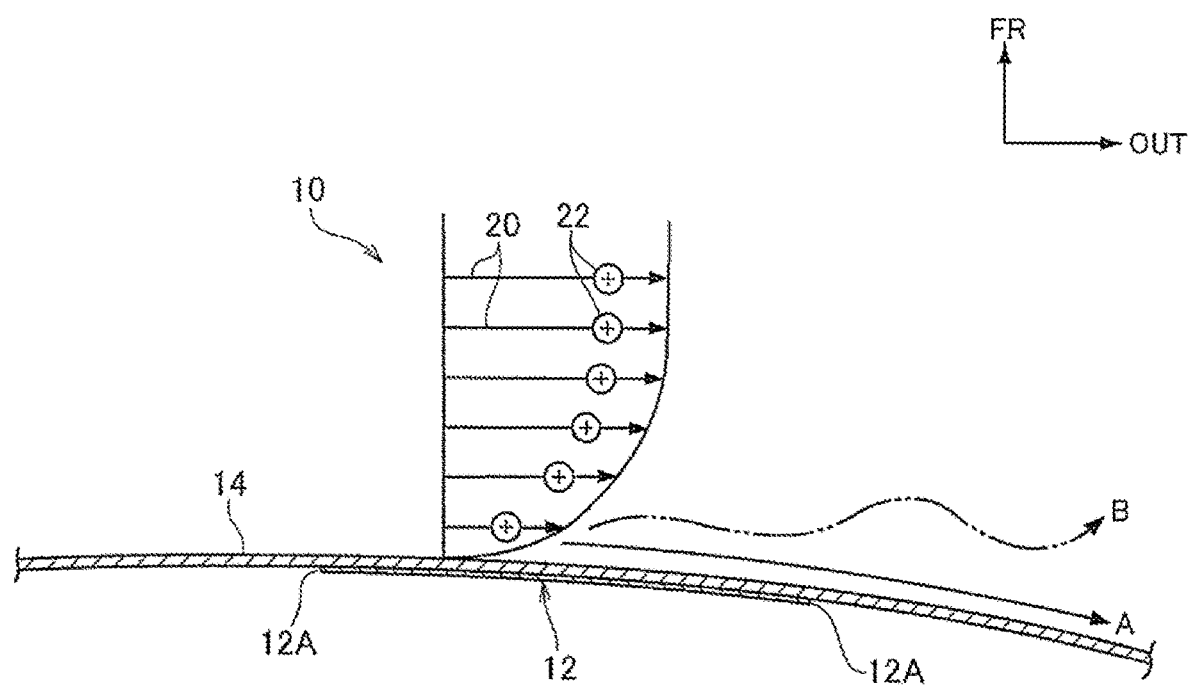
FIG. 8 is an enlarged sectional view on an III-III arrow view in FIG. 6 illustrating an airflow on a surface of a bumper cover.

In recent vehicles 10, a lot of resin members are used for the exterior components from the viewpoint of weight reduction and processability. Since the resin has electric resistance larger than that of metal, a charging amount on the surface of the resin member caused by the airflow becomes large. Specifically, a change in the potential of approximately 100 to 4000 V between the vehicle 10 before running and the vehicle 10 after running can be generated on the surfaces of the exterior components. FIG. 8 is a sectional view of the exterior component for explaining the change in the airflow when the surface of the exterior component is positively charged, and is a III-III arrow view enlarged sectional view of FIG. 6. An arrow A in FIG. 8 indicates the airflow when the exterior component is not charged, and an arrow B indicates the airflow when the exterior component is charged. As illustrated in FIG. 8, a flow of air 20 during running of the vehicle is usually charged with positive charges 22, and the surface of the bumper cover 14 is also charged with the positive charges (not shown). Thus, the repulsive force can be easily generated between the surface of the resin member and the air.

In the vehicle 10, since the conductive film 12 is provided on the inner surface of the bumper cover 14, charges on the surface of the bumper cover 14 is suppressed. It is considered that charging is suppressed as following mechanism. When the vehicle 10 runs, the positively charged air flows around the vehicle body, and the outer peripheral surface of the tire is brought into contact with the road surface and is separated therefrom, repeatedly. Due to such internal factors or other external factors, the vehicle body is gradually charged with positive static electricity. The conductive film 12 mounted on the aforementioned specific portion of the vehicle body is charged with the positive static electricity similarly to the vehicle body. Then, since the corner part 12A of the conductive film 12 is sharp or pointed, the charges are concentrated on the corner part 12A. With that, the negative air ions (minus ions) are drawn to the periphery of the conductive film 12, and finally, corona discharge is generated. That is, self-discharging occurs by the charges with which the conductive film 12 is self-charged, without giving charges by an electric device such as a battery. At the same time, the charges present at the portion where the conductive film 12 is provided are neutralized and eliminated, and the potential is lowered. As a result, the repulsive force between the airflow and the vehicle is reduced. Withdrawal of the air ion accompanied by such corona discharge or lowering of the repulsive force and the like suppresses the separation of the airflow from the vehicle body surface on the aforementioned specific portion (separation shape portion) and the periphery thereof (a range of approximately 150 to 200 mm in diameter around the specific portion, for example). Suppressing the separation of the airflow from the vehicle body surface leads to suppression of disturbance of the air or fluctuation in the air pressure or the like on the specific portion on the vehicle body surface or the periphery thereof. Specifically, the airflow is not disturbed as in the arrow B direction but smoothly flows as in the arrow A direction along the surface of the bumper cover 14. As a result, the aerodynamic characteristics as assumed or close to the assumption are obtained, and power performances, manipulation stability or braking performances or running characteristics such as riding comfortableness or the like from running at an extremely low speed to running at a high speed are improved. Moreover, since the charges on the vehicle body are generated mainly by running of the vehicle 10, if the vehicle runs at a higher speed, the charging amount increases and the self-discharging can be generated more easily. Thus, the running characteristics during medium-to-high speed running can be improved. The similar effect can be also obtained when the transparent conductive material is provided on the specific portion instead of the conductive film 12.

Moreover, in the vehicle 10, since the conductive film 12 is provided on the inner surface (rear surface) of the bumper cover 14, the appearance is not damaged. Moreover, a mass increase can be suppressed by using the conductive film 12 for the self-discharging static eliminator. Moreover, since a design change of an outer shape of the vehicle 10, a temporary change of the outer shape by a control device, a flow control portion by blowing-out or suctioning and the like are not needed, a cost is low.

Figure 7B:
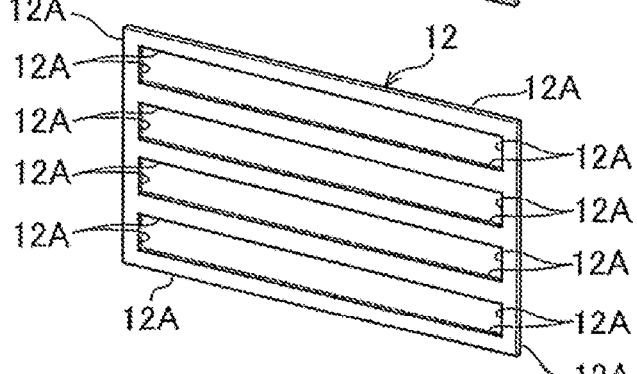
Figure 7C:
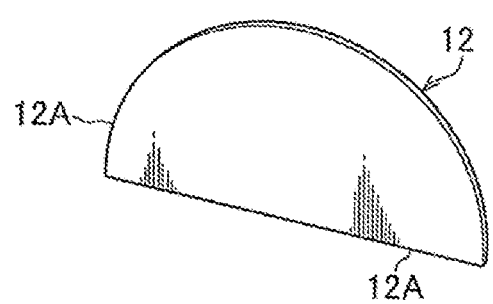
Figure 7D:
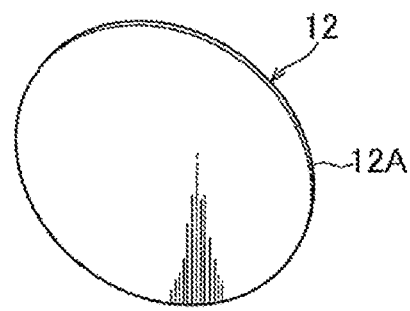

The shape of the sharp corner part 12A is not limited to a square but may be a lattice state having more corner parts 12A as illustrated in FIG. 7B so that more corona discharges are generated. Moreover, as illustrated in FIG. 7C, it may be a half circular shape. Furthermore, as illustrated in FIG. 7D, it may be a circular shape in which an edge of an arc of an outer peripheral portion is made a sharp corner part 12A. Since the conductive film 12 has a thickness, a cut surface on a periphery thereof may be jagged so that the pointed corner part 12A is formed by the jagged cut surface. Furthermore, sharp or pointed projections and recesses may be formed by knurling or the like on the surface of the conductive film 12 so that the projection part is made the aforementioned corner part 12A.

The charging suppression member contains the conductive metal material having the corner part which generates self-discharging. The arrangement position of the charging suppression member is not particularly limited and may be provided not only on the inner surface of the exterior component but on the outer surface, for example. Moreover, the conductive metal material is not limited to a metal material, and the conductive metal materials include conductive polymers such as polyaniline, polypyrrole, or polythiophene and the like, conductive plastic, conductive paints, plating and the like. Moreover, the members made of metal include garnish made of aluminum, for example.

Figure 9:
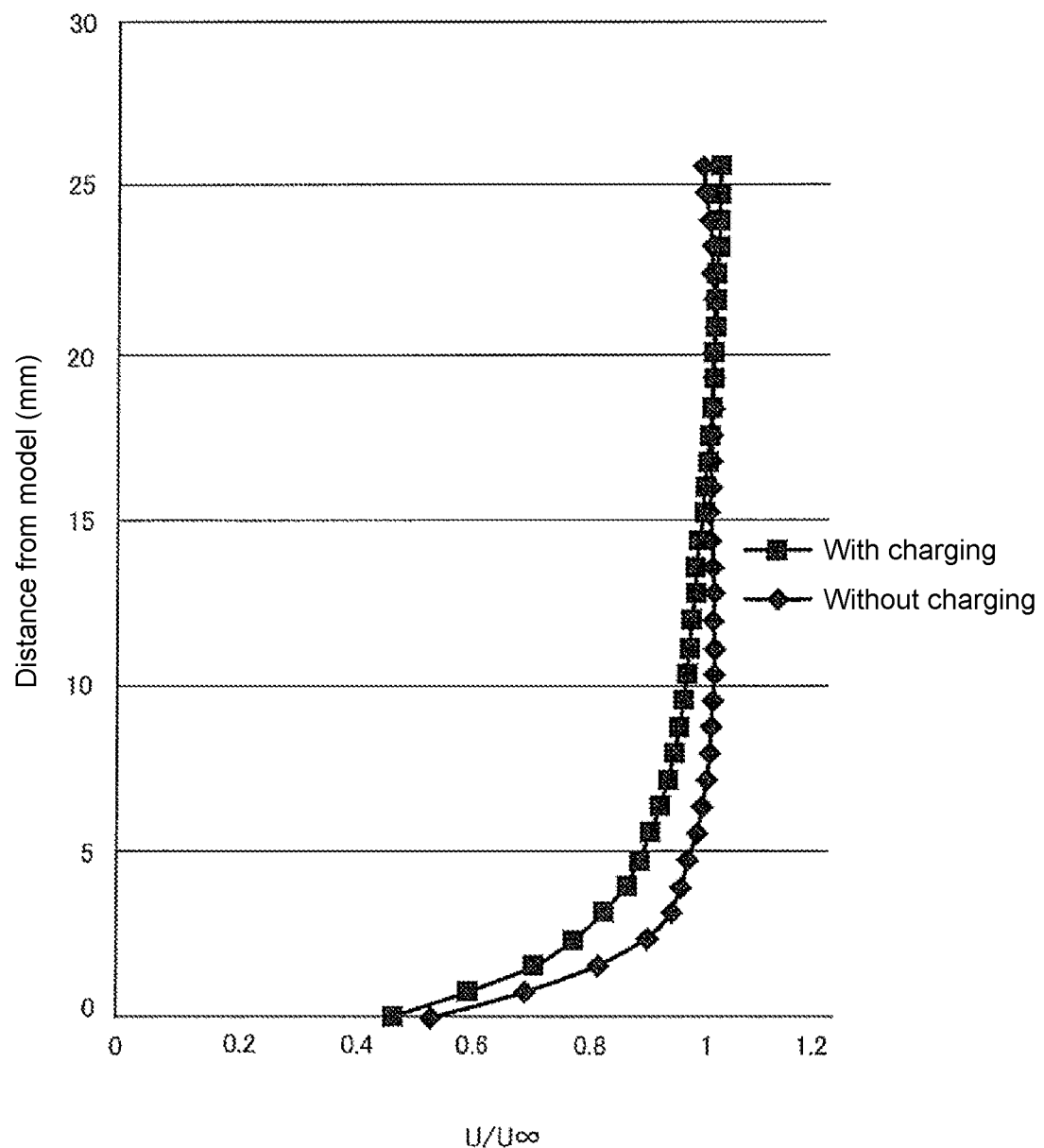
FIG. 9 is a graph illustrating a result of measurement of flow velocity distribution in a direction perpendicular to a surface of a vehicle body model.

Here, an effect of electric neutralization and elimination of static electricity charged on the vehicle body will be described by referring to FIG. 9. FIG. 9 is a graph illustrating a result of measurement of flow velocity distribution in a direction perpendicular to a surface of a vehicle body model. A vertical axis indicates a distance from the model surface, and the lateral axis indicates a ratio of a flow velocity U (U/U∞) measured at each distance from the model with respect to the flow velocity U∞ of the air blown to the model. Moreover, a result of the measurement in a state where the model is not charged is plotted by diamonds, and a result of the measurement in a state where the model is charged with positive charges is plotted by squares.

As illustrated in FIG. 9, a thickness of a boundary layer (a distance from the model surface when U/U∞ is substantially "1") when the model is charged with positive (+) charges is larger than the thickness of the boundary layer when the model is not charged with the positive (+) charges.

That means that, when the model is charged with the positive (+) charges, the separation becomes larger than a case where the model is not charged with the positive (+) charges. As described above, since the airflow is usually charged with the positive charges, the repulsive force is generated by the positive charges with which the model is charged and the positive charges of the airflow. As a result, the separation of the airflow from the surface of the model is considered to be increased. Therefore, by neutralizing and eliminating the vehicle body charged with the positive (+) static electricity and by lowering the positive (+) potential of the outer surface of the vehicle body, the flow (the flow separated from the surface) of the air when the model is charged with the positive (+) charges can be changed to the flow (the flow along the surface) when the model is not charged with the positive (+) charges. That is, the separation of the airflow from the outer surface of the vehicle body can be suppressed.

Figure 10A:
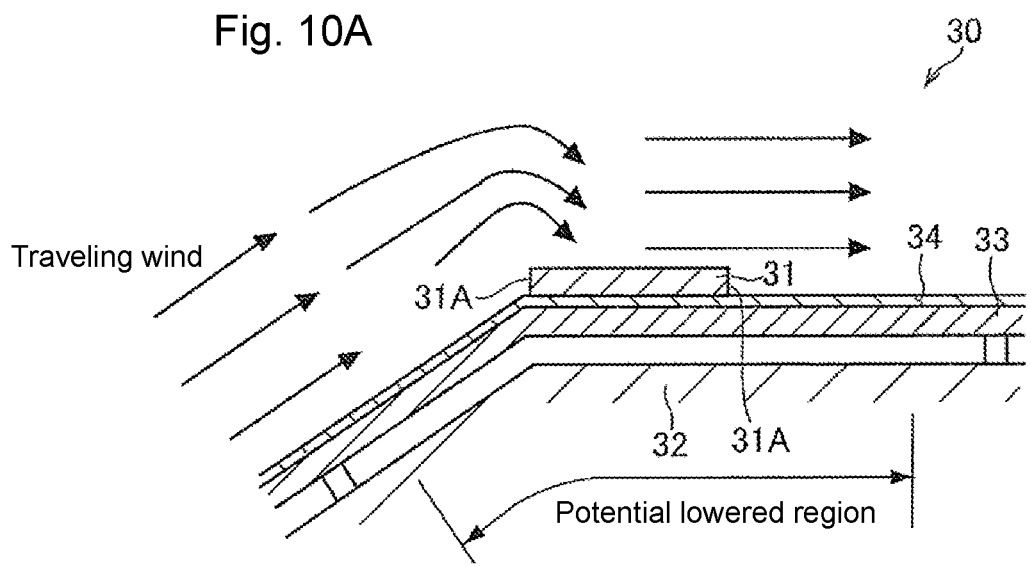
Figure 10B:
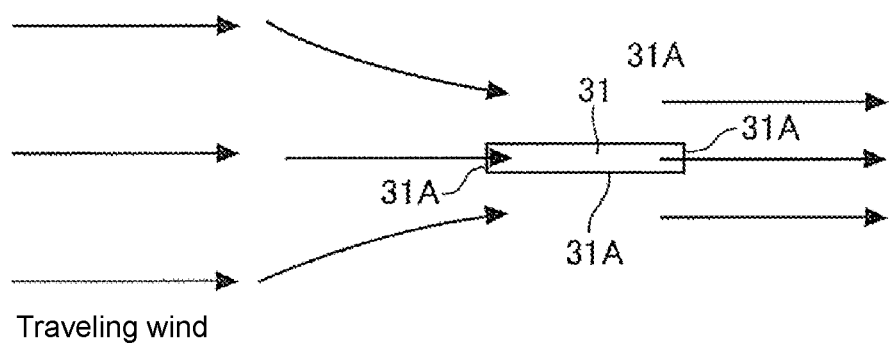

As described above, with regard to the airflow charged with the positive (+) charges flowing in the vicinity of the surface of the model, its position of the separation in accordance with the positive (+) potential of the model or a degree of the separation is changed. Thus, the vehicle according to the present disclosure is constituted such that the separation of the airflow charged positively (+) generated on the outer surface of the vehicle body is suppressed or such that the separation is reduced by neutralizing and eliminating the positive (+) static electricity charged on the vehicle body. An example of the constitution is illustrated in FIG. 10. FIG. 10 illustrate the example in which the self-discharging static eliminator 31 (hereinafter, referred to as a self-discharger) which corona-discharges by energy of positive (+) static electricity charged on the vehicle body 30 is attached to the outer surface of the vehicle body 30, in which FIG. 10A illustrates a sectional view thereof, and FIG. 10B illustrates a plan view thereof. In the vehicle body 30 illustrated here, a cover member 33 formed of a resin material is mounted on a steel plate 32 for obtaining rigidity, and coating 34 made of glass is applied to the surface of the cover member 33. The vehicle body 30 may be constituted by any one material of a resin material, a glass material or a metal material such as iron, aluminum and the like.

The vehicle body 30 constituted as above is charged positively (+) with static electricity in accompany with running. Specifically, the positive (+) static electricity is generated by an electric action accompanying friction or the like between a traveling air or the airflow or the like flowing in an intake/exhaust pipe and the surface of the vehicle body 30 and is charged as described above. Moreover, when a power source such as the engine or the motor, a transmission or a suspension or the like is driven, a plurality of members constituting those devices slides. The positive (+) static electricity is generated by the electric action accompanying such sliding of the members, and charging occurs. Moreover, the positive (+) static electricity is generated by the friction between a wheel constituted by rubber and a road surface or the electric action by the separation of the surface on which the rubber of the wheel is rotated and in contact with the road surface leaving from the road surface, and charging occurs. Alternatively, charging with the positive (+) static electricity can occur with electricity of the electric devices mounted on the vehicle 10 or an electric device such as a power-transmission line outside the vehicle 10.

Usually, since the wheel is constituted by an insulating body such as rubber (or a material with small electric conductivity), the positive (+) static electricity generated as above remains in the vehicle body 30. A part of the charges is accumulated locally on the outer surface of the vehicle body 30. The charged static electricity is changed in accordance with the electric conductivity. Thus, even a metal material with relatively high electric conductivity has electric resistance more or less on a connection portion, a metal panel is charged with the positive (+) static electricity depending on a condition in some cases. Therefore, the aforementioned specific portion is not limited to a portion of the member constituted by a resin material but includes a vehicle body surface portion constituted by a metal material, a glass material or any other materials such as rubber or paint film.

In the example illustrated in FIG. 10, the self-discharger 31 which discharges the positive (+) static electricity charging the outer surface of the vehicle body 30 is attached to the outer surface of the vehicle body 30 or more specifically, to the surface of the coating 34. This self-discharger 31 is a conductive member and is constituted such that corona discharge is caused in accordance with the static electricity energy of the positive charges charged on the portion to which the self-discharger 31 is attached and the vicinity thereof. The self-discharger 31 can be constituted similarly to the aforementioned conductive film 12. For example, a thin piece made of metal such as aluminum foil and a paint having conductivity are included. Since the corona discharge is generated at a pointed portion as is known, a plurality of projections and recesses are formed on the self-discharger 31. Specifically, when the thin piece is used as the self-discharger 31, the thin pieces may be formed by cutting out so that projections and recesses are formed on their side surfaces (cut surfaces). Pointed tower-shaped projections and recesses may be formed on the surface by mixing powders of a metal material and by painting it or the like, or a plurality of projections and recesses may be formed on the surface by knurling the surface of the self-discharger 31. The self-discharger 31 illustrated in FIG. 10 is formed by aluminum foil having a rectangular shape with a predetermined thickness, and a plurality of projections and recesses 31A is formed on an outer peripheral wall surface thereof.

Here, self-discharging of the positive (+) static electricity charged on the vehicle body 30 by attached the self-discharger 31 on the outer surface of the vehicle body 30, that is, the action by electric neutralization and elimination will be described. As described above, when the airflow is charged with the positive (+) charges and the outer surface of the vehicle body 30 is also charged positively (+), the repulsive force is generated so that the airflow separates from the outer surface of the vehicle body 30. On the other hand, the airflow flowing on the surface of the vehicle body 30 changes to the flow along the surface of the vehicle body 30 by the Coanda effect in accordance with a relative speed difference from the vehicle body 30. Even on the specific portion where the surface of the vehicle body 30 is bent as described above and the separation of the airflow can easily occur, the airflow is going to flow along the surface of the vehicle body 30 due to the Coanda effect. However, the aforementioned repulsive force acts so as to inhibit such flow line of the airflow. When the charges in the vehicle body 30 which causes this repulsive force increases, the corona discharge finally occurs in the self-discharger 31, and accordingly the positive (+) potential in the portion in the vicinity of the self-discharger 31 on the outer surface of the vehicle body 30 lowers. When the positive (+) potential lowers in the self-discharger 31 and in the vicinity thereof as above, the repulsive force becomes smaller. Moreover, as the charges in the self-discharger 31 increases, negative ions of the air are generated around the self-discharger 31, they are attracted by the self-discharger 31 and the positive charges around the discharger 31, thereby the airflow is attracted to the periphery of the self-discharger 31 on the surface of the vehicle body 30. As described above, the separation of the airflow from the outer surface of the vehicle body 30 can be suppressed. FIG. 10 illustrate a region where the potential is lowered by the self-discharger 31, and the range is a range with a diameter of approximately 150 to 200 mm around the self-discharger 31. Even when the transparent conductive material is disposed on the specific portion instead of the self-discharger 31, the positive potential of the specific portion can be lowered in accordance with the similar mechanism, and the separation of the airflow can be suppressed.

Since the separation of the airflow is suppressed as described above, a change or deterioration of the aerodynamic characteristics in a pitching direction, in a rolling direction or in a yaw direction can be suppressed. As a result, head-turning property or the manipulation stability or running performances such as acceleration can be improved. Even if the vehicle body 30 is deflected with respect to the airflow during turning, for example, a difference in the air pressure between an inner wheel side and an outer wheel side of the vehicle body 30 is suppressed, and predetermined head-turning property or turning performances assumed in design can be obtained. Moreover, since the potential in the predetermined range can be lowered around the self-discharger 31 as described above, even if the vehicle 10 is subjected to crosswind or the airflow flows from diagonally front during turning, the aforementioned effect can be exerted. Therefore, manipulation stability can be improved even when subjected to the crosswind or during turning.

Figure 11A:
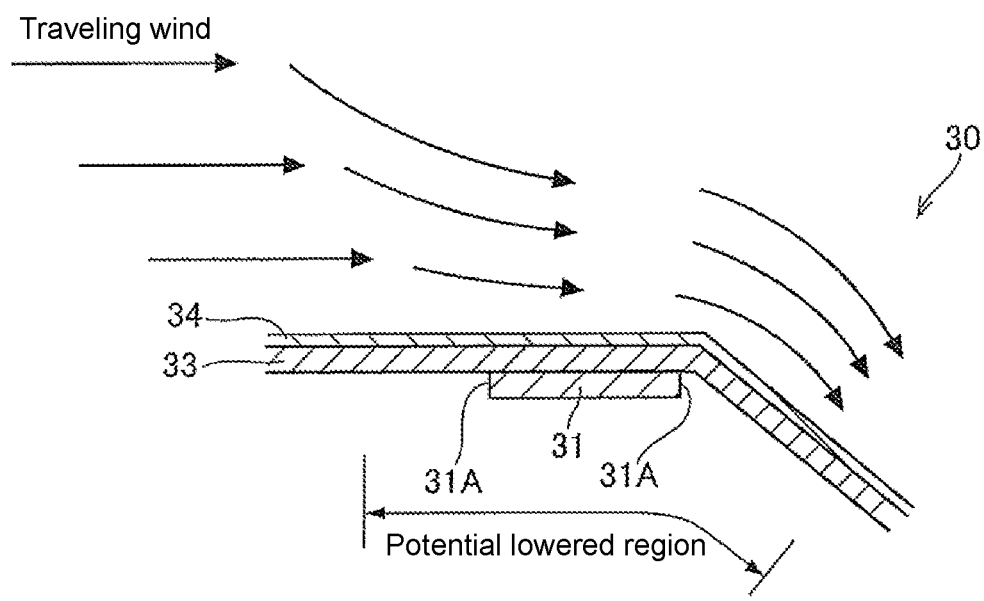
Figure 11B:
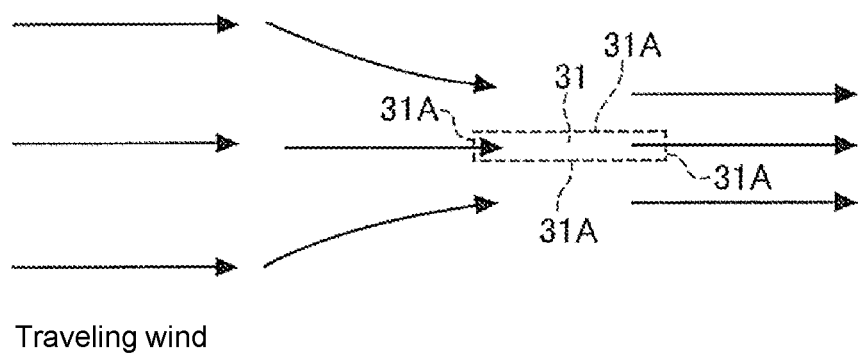

The self-discharger 31 constituted as above can neutralize and eliminate the positive (+) static electricity in the predetermined range around the portion where the self-discharger 31 is attached. Moreover, it is only necessary that there is air on an upper surface of the self-discharger 31. Therefore, for example, even if the self-discharger 31 is mounted on the inner surface on the side opposite to the outer surface which exposes as the appearance of the vehicle 10 as illustrated in FIG. 11, the positive (+) static electricity charged on the vehicle body 30 can be neutralized and eliminated similarly to the case where the self-discharger 31 is attached to the outer surface. In the example illustrated in FIG. 11, the air can flow through a gap between the steel plate 32 and the cover member 33. Moreover, by attaching the self-discharger 31 to the inner surface on the side opposite to the outer surface which appears as the appearance of the vehicle 10, the aforementioned effect can be exerted without damaging the appearance. Moreover, by disposing the transparent conductive material on the outer surface which appears as the appearance and by causing the transparent conductive material to be electrically continuous with the self-discharger 31, the static electricity can be neutralized and eliminated more effectively. FIG. 11 illustrate the example in which the self-discharger 31 is attached to the inner surface on the side opposite to the outer surface which appears as the appearance of the vehicle 10, in which FIG. 11A illustrates a sectional view thereof, and FIG. 11B illustrates a plan view thereof.

In the aforementioned example, the self-discharger 31 is disposed on the outer surface or the inner surface on the side opposite to that of the member of the vehicle body 30, but the self-discharger 31 is disposed at a position where an absolute value of the positive (+) potential of a portion where the airflow can easily separate can be lowered in some cases. Specifically, the self-discharger 31 can be disposed at a portion having the separation shape where the flow along the surface of the vehicle body 30 begins to change to the flow separated from the surface thereof. More specifically, the self-discharger 31 can be disposed on a portion where the outer surface of the vehicle body 30 is formed by bending at a predetermined angle or more with respect to the flow direction of the traveling air. The portion having the separation shape can be determined in advance by a cavity experiment or the like. Alternatively, it can be determined on the basis of the shape of the outer surface of the vehicle body 30. Therefore, it is only necessary that such a portion where the separation of airflow caused by installation of the self-discharger and the change to the flow separated from the surface of the vehicle body 30 can be suppressed is acquired in advance, and the self-discharger 31 (or the transparent conductive material) is attached to the portion.

With regard to a manufacturing method of the vehicle in the exemplary embodiment, the portion where the aforementioned separation of the airflow can easily occur can be acquired by using a vehicle body model or a prototypal vehicle. At the same time, by actually disposing the aforementioned conductive film 12 or the self-discharger 31 (or the transparent conductive material) on those portions, whether the positive potential can be lowered is verified. As a result, a portion where the manipulation stability of the vehicle 10 is improved can be acquired experimentally. In a manufacturing process of the vehicle 10, the aforementioned conductive film 12 or the self-discharger 31 (or the transparent conductive material) is mounted so that the positive charges of the portion acquired as above is lowered.

Figure 12A:
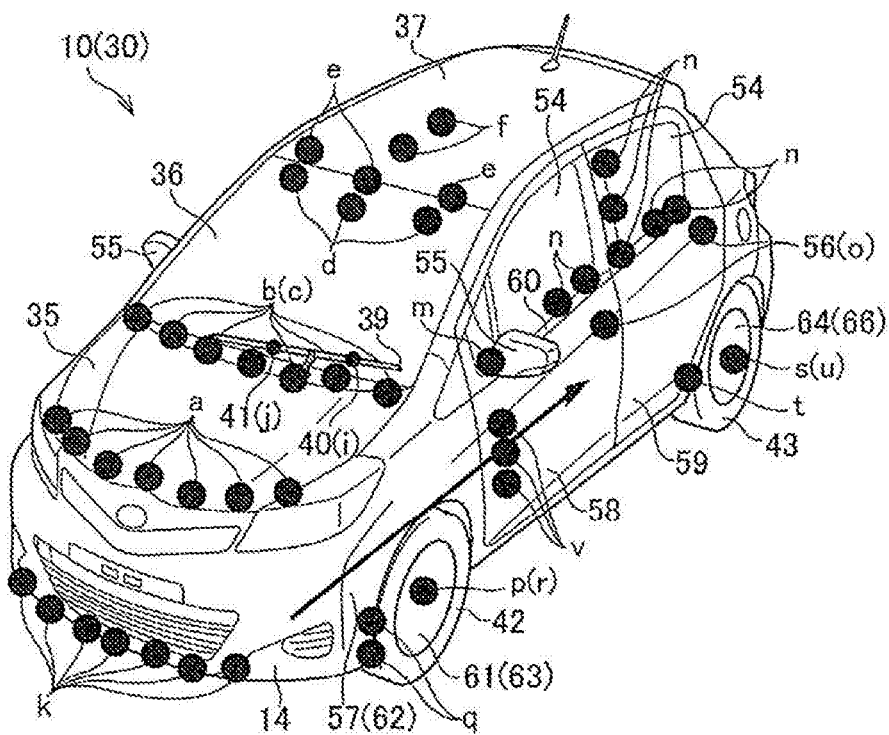
Figure 12B:
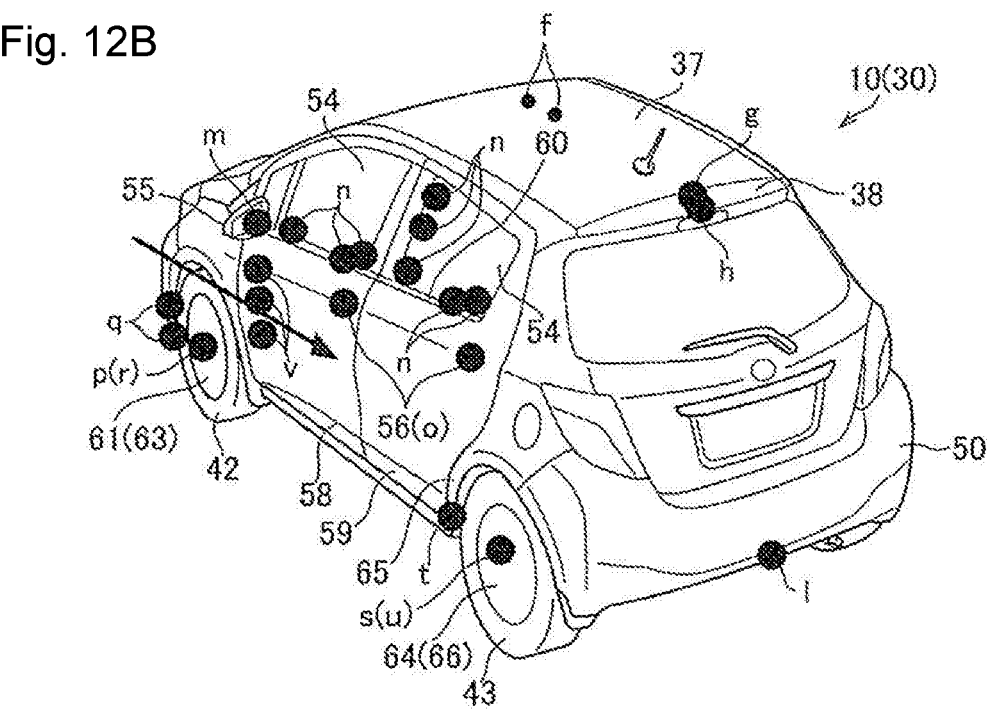

FIG. 12 are perspective views of the vehicle 10 illustrating an example of a position where the self-discharger 31 is provided, in which FIG. 12A illustrates a perspective view of the vehicle 10 when seen from diagonally front, and FIG. 12B illustrates a perspective view of the vehicle 10 when seen from diagonally rear. Portions indicated by solid circles in the views indicate positions where the self-dischargers 31 are attached. The vehicle 10 illustrated in FIG. 12 is a small-sized hatch back vehicle. In this vehicle 10, the self-dischargers 31 are disposed so that the separation of the airflow in the vertical direction is suppressed, that is, the change in the aerodynamic characteristics in the pitching direction caused by the separation of the airflow is suppressed. Specifically, the self-dischargers 31 are disposed so that the positive (+) potential on the center part of the vehicle 10 in the width direction is lowered. Since it is only necessary that the change in the aerodynamic characteristics of the vehicle body 30 in the pitching direction can be suppressed, the self-dischargers 31 only need to be disposed on the center part at least in the vehicle width direction on the upper surface or the lower surface of the vehicle body 30. Therefore, a plurality of the self-dischargers 31 may be disposed at a predetermined interval on both sides with the center part between them. Moreover, in order to suppress lowering of a grounding load of a front wheel 42 which is a steering wheel, the separation of the airflow in a wide region in the vehicle width direction is suppressed by disposing the plurality of self-dischargers 31 uniformly on right and left in addition to the center part. As described above, the transparent conductive material can be disposed so as to include these positions. In the following, the position where the self-discharger 31 is attached so as to suppress the change in the aerodynamic characteristics of the vehicle body 30 in the pitching direction and an action caused by attaching the self-discharger 31 to that position will be described.

In an example illustrated in FIG. 12, the self-dischargers 31 are disposed on a front end portion (indicated as a points in the view) of the engine hood 35, a rear end portion (indicated as b points in the view) of the engine hood 35, a lower end portion (indicated as c points in the view) of the windshield 36, an upper end portion (indicated as d points in the view) of the windshield 36, a front end portion (indicated as e points in the view) of a ceiling 37, a front portion (indicated as f points in the view) of the ceiling 37, a rear portion (indicated as g points in the view) of the ceiling 37, a roof spoiler 38 (indicated as h points in the view) and the like. If a wiper 39 ejects to the outer surface of the vehicle 10, it is likely that the wiper 39 makes a step and the airflow separates and thus, the self-dischargers 31 are arranged on a blade 40 and an arm 41 of the wiper 39 as indicated as i and j points illustrated in FIG. 12 in some cases. By disposing the self-dischargers 31 (or the transparent conductive materials) so that the positive (+) static electricity on the upper surface of the vehicle 30 is discharged as above, an upper surface side of the vehicle body 30 is prevented from having a negative pressure by the separation of the airflow on the upper surface of the vehicle body 30 from the upper surface of the vehicle body 30. That is, lowering of the down force pressing down the vehicle body can be suppressed, and the grounding load between the front wheel 42 or a rear wheel 43 and the road surface can be maintained within an assumed range or to a proper value.

Figure 13A:
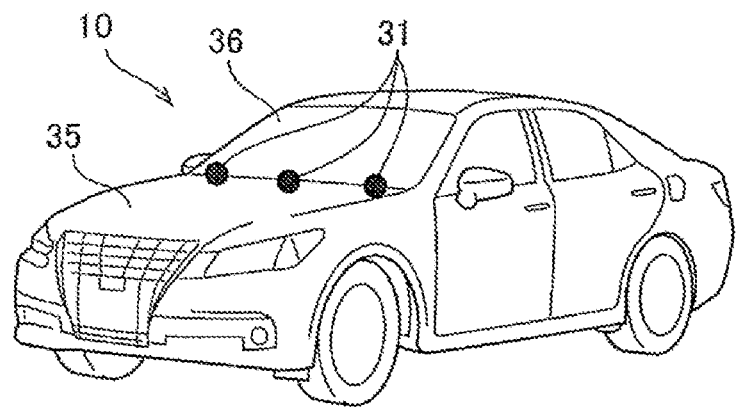
Figure 13B:
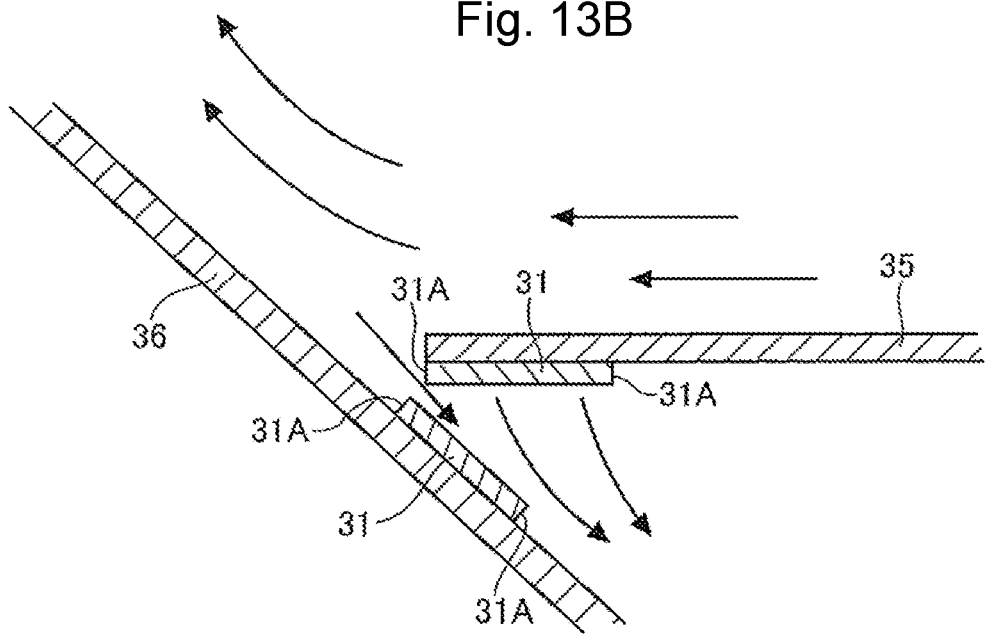

FIG. 13 illustrate an example in which the self-dischargers 31 are attached to the lower end portion of the windshield 36 and the lower surface of the engine hood 35 in the sedan type vehicle 10. FIG. 13A illustrates a perspective view of the vehicle 10, and FIG. 13B is a sectional view illustrating positions where the self-dischargers 31 are attached to the lower end portion of the windshield 36 and on the lower surface of the engine hood 35. Since the self-discharger 31 has not a small thickness, if the self-discharger 31 is provided by being exposed to the airflow, it is likely that the airflow is disturbed in the vicinity of the self-discharger 31. Thus, in the example illustrated in FIG. 13, the self-dischargers 31 are provided at the positions not exposed to the airflow along the upper surface of the engine hood 35 and the surface of the windshield 36. Specifically, the self-discharger 31 is attached to the outer surface of the windshield 36 on a portion on a side lower than the upper surface of the engine hood 35 in the vertical direction, and moreover, the self-discharger 31 is attached to the lower surface of the rear end portion of the engine hood 35. Since the gap for discharging rain water or the like is formed between the windshield 36 and the engine hood 35 as illustrated in FIG. 13, a part of the air flowing toward the windshield 36 flows into the gap. Thus, since the air flows on the surface of the self-discharger 31, the positive (+) static electricity on the self-discharger 31 and the surface of the vehicle body 30 on the peripheral surface thereof can be effectively eliminated.

By providing the self-discharger 31 as above, the positive (+) potential on the lower end portion of the windshield 36 and the rear end portion of the engine hood 35 can be lowered and thus, when the air flows from the upper surface of the engine hood 35 to the surface of the windshield 36, generation of the repulsive force in the airflow can be suppressed. Thus, the upper surface side of the vehicle body 30 is prevented from having a negative pressure by the separation of the airflow. That is, lowering of the down force pressing down the vehicle body can be suppressed, and the grounding load between the front wheel 42 or the rear wheel 43 and the road surface can be maintained within the assumed range or to the proper value.

Moreover, in the embodiment illustrated in FIG. 13, by disposing the transparent conductive material on the windshield 36 and by causing the transparent conductive material and the self-discharger 31 to be continuous as described above, charging in the windshield 36 can be also solved.

Figure 14:
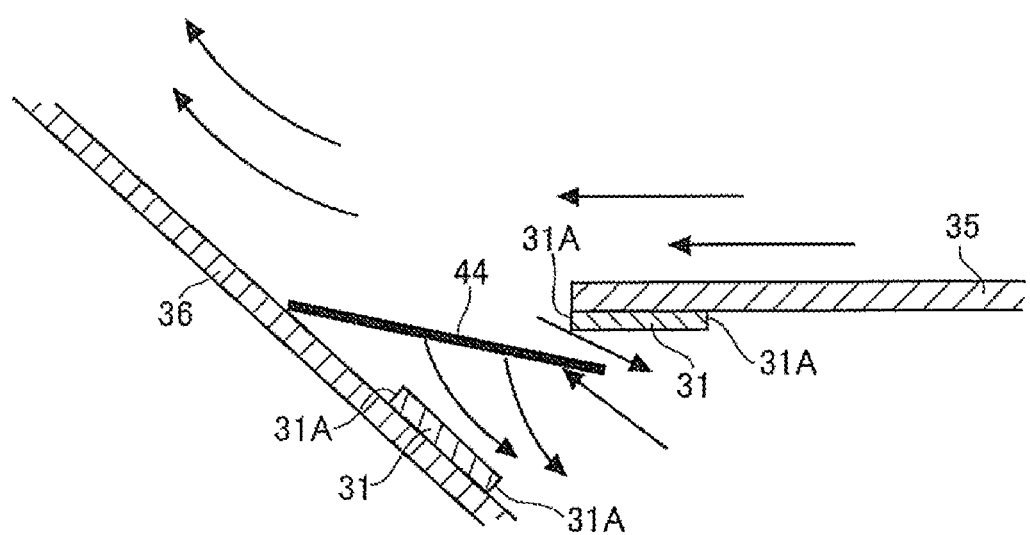
FIG. 14 is a sectional view for explaining an example in which a straightening cover is provided so that the airflow around the vehicle body does not directly hit the self-discharger attached to the outer surface on the lower part of the windshield.

The air flows in the vicinity of the self-discharger 31 as described above in some cases, but if the gap between the windshield 36 and the engine hood 35 is large, it is likely that the aerodynamic characteristics of the airflow along the windshield 36 changes due to various reasons such as an increase in the air amount flowing in the engine room through the gap. Thus, as illustrated in FIG. 14, a straightening cover 44 formed so as to reduce the air amount flowing in through the gap between the windshield 36 and the engine hood 35 may be provided on a part upper than the self-discharger 31 and the side lower than the upper surface of the engine hood 35. The straightening cover 44 illustrated in FIG. 14 is a plate-shaped member formed having substantially the same width as that of the windshield 36.

Figure 15A:
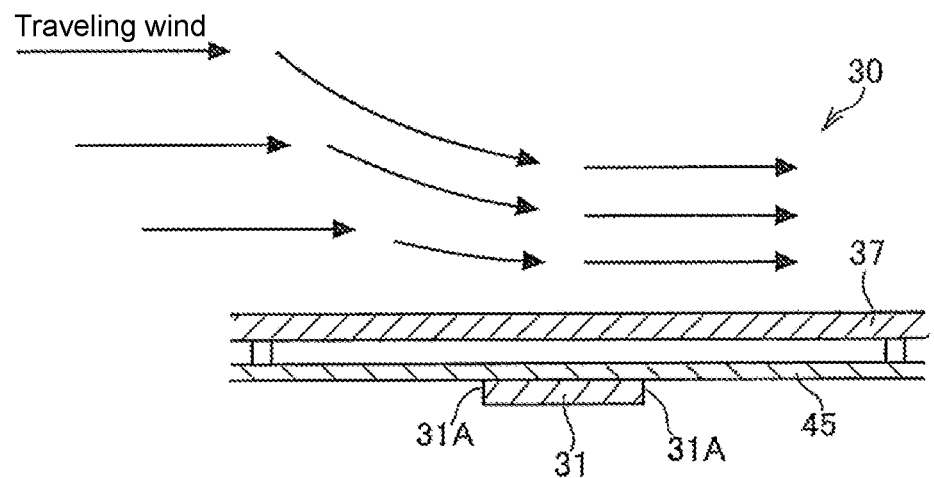

FIG. 15 are sectional views for explaining the position where the self-discharger 31 is attached in order to eliminate the static electricity of the ceiling 37. In an example illustrated in FIG. 15A, an indoor roof liner 45 formed of a resin material with a predetermined gap is provided on a cabin side of the ceiling 37, and a space between the ceiling 37 and the indoor roof liner 45 is made a space closed to the outside. The self-charging lowers the potential of the self-discharger 31 and the periphery thereof since the air flowing in the vicinity of the self-discharger 31 has negative ions. Therefore, as illustrated in FIG. 15A, if a side opposite to the outer surface of the ceiling 37 is a closed space, it is likely that the effect of disposing the self-discharger 31 in that space cannot be effective obtained. Thus, in the example illustrated in FIG. 15A, the self-discharger 31 is attached to a surface in the indoor roof liner 45 in the inner side of the cabin. When the self-discharger 31 is attached to the indoor roof liner 45 as above, the indoor roof liner 45 is neutralized and eliminated. Since the potential of the closed space is lowered by lowering of the potential of the indoor roof liner 45 as above, the potential of the ceiling 37 formed of a steel plate can be lowered in the end. That is, by attaching the self-discharger 31 to the surface in the indoor roof liner 45 on the cabin side, the potential of the ceiling 37 can be lowered indirectly through the indoor roof liner 45 and the air layer in the closed space. As a result, since the separation of the airflow from the outer surface of the ceiling 37 can be suppressed, lowering of the down force pressing down the vehicle body 30 can be suppressed. Moreover, since the separation of the airflow in the direction inclined from the longitudinal direction of the vehicle 10 during turning or when subjected to the crosswind can be suppressed, the change of the aerodynamic characteristics in the yaw direction can be suppressed. As a result, manipulation stability, riding comfortableness and the like can be improved.

Figure 15B:
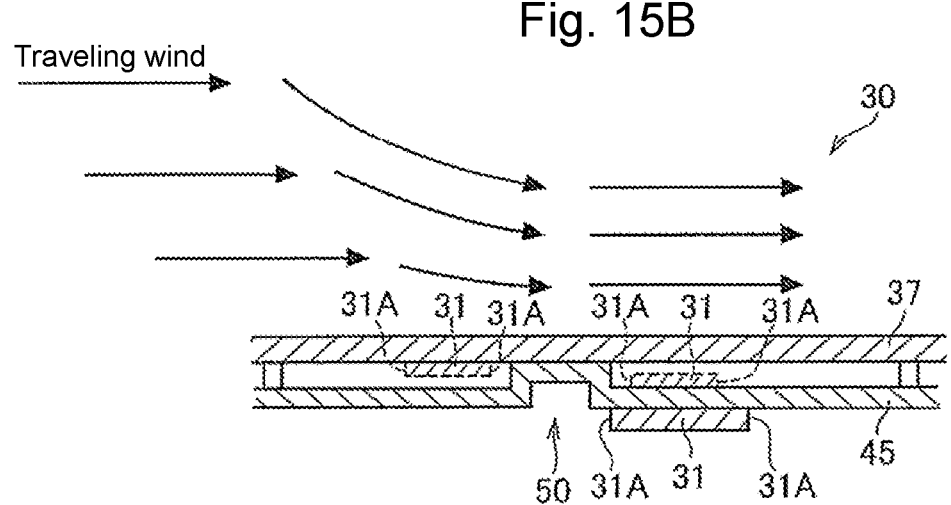

FIG. 15B is a sectional view illustrating another example of elimination of the static electricity on the ceiling 37. In the example illustrated in FIG. 15B, the indoor roof liner 45 is bent and formed on the inner surface on the side opposite to the outer surface of the ceiling 37 on a specific portion in the ceiling 37 where the airflow separates so that a part of the indoor roof liner 45 is in contact. And the self-discharger 31 for lowering the positive potential of the bent portion is provided in the vicinity of the bent portion in the surface of the indoor roof liner 45 on the cabin side. Since electricity of the bent portion can be neutralized and eliminated, and the positive potential can be lowered by attaching of the self-discharger 31 as above, the positive potential of the ceiling 37 can be lowered without through the air layer. As a result, since the separation of the airflow from the outer surface of the ceiling 37 can be suppressed, lowering of the down force pressing down the vehicle body 30 can be suppressed. Moreover, since the separation of the airflow in the direction inclined from the longitudinal direction of the vehicle 10 during turning or when subjected to the crosswind can be suppressed, the change of the aerodynamic characteristics in the yaw direction can be suppressed. As a result, manipulation stability, riding comfortableness and the like can be improved.

Figure 16A:
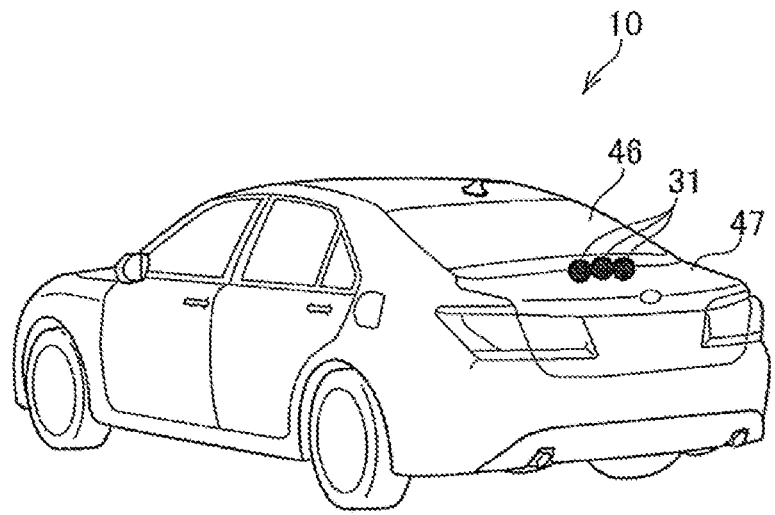
Figure 16B:
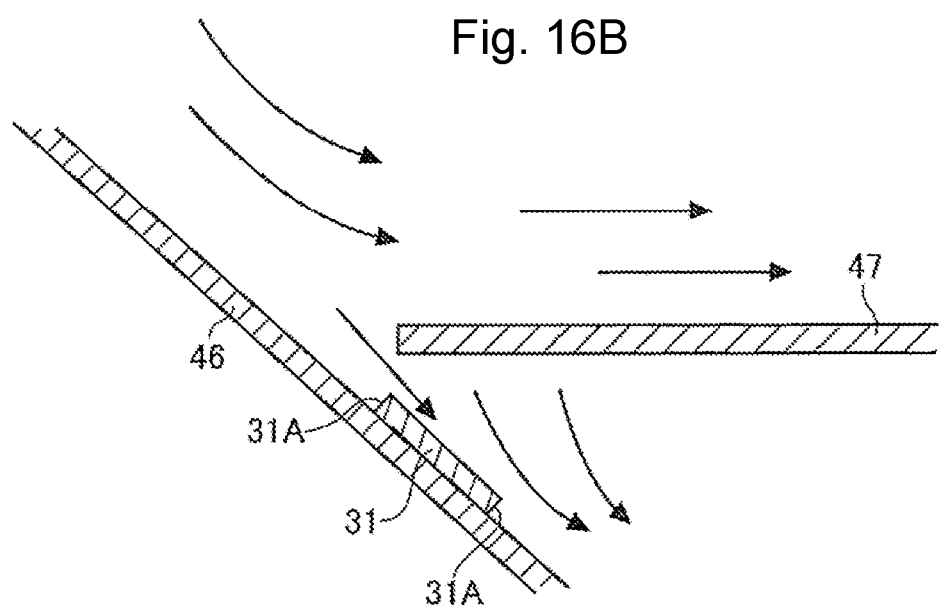

Moreover, as illustrated in FIG. 16, a gap is formed between a rear glass 46 of the sedan type vehicle 10 and a luggage door 47. Thus, similarly to FIG. 13, the self-discharger 31 is provided on a lower end portion of the rear glass 46 in order to lower the positive (+) potential of the rear glass 46. Specifically, the self-discharger 31 is provided on the outer surface of the luggage door 47 on a portion lower than the upper surface of the luggage door 47 in the vertical direction. By disposing the self-discharger 31 as above and by discharging the positive (+) static electricity of the rear glass 46 so as to lower the positive (+) potential, the separation of the airflow from the rear glass 46 can be suppressed. As a result, the lowering of the down force pressing down the vehicle body 30 can be suppressed, and the grounding load between the front wheel 42 or the rear wheel 43 and the road surface can be maintained within the assumed range or to the proper value.

Moreover, in the embodiment illustrated in FIG. 16, the transparent conductive material is disposed on the whole surface of the rear glass 46 and the self-discharger 31 is disposed on the rear glass 46 on the transparent conductive material and on the portion lower than the upper surface of the luggage door 47 in some cases. By means of this form, the charging on the whole surface of the rear glass 46 can be solved while transparence required for the glass member is ensured.

Figure 17A:
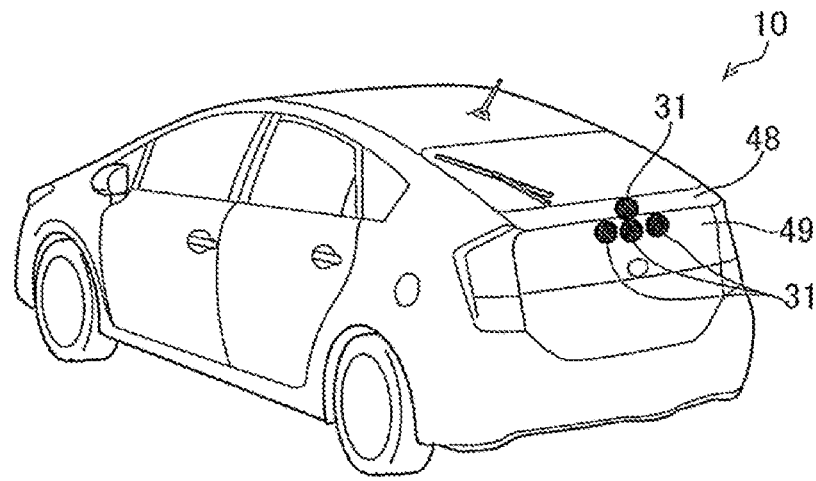
Figure 17B:
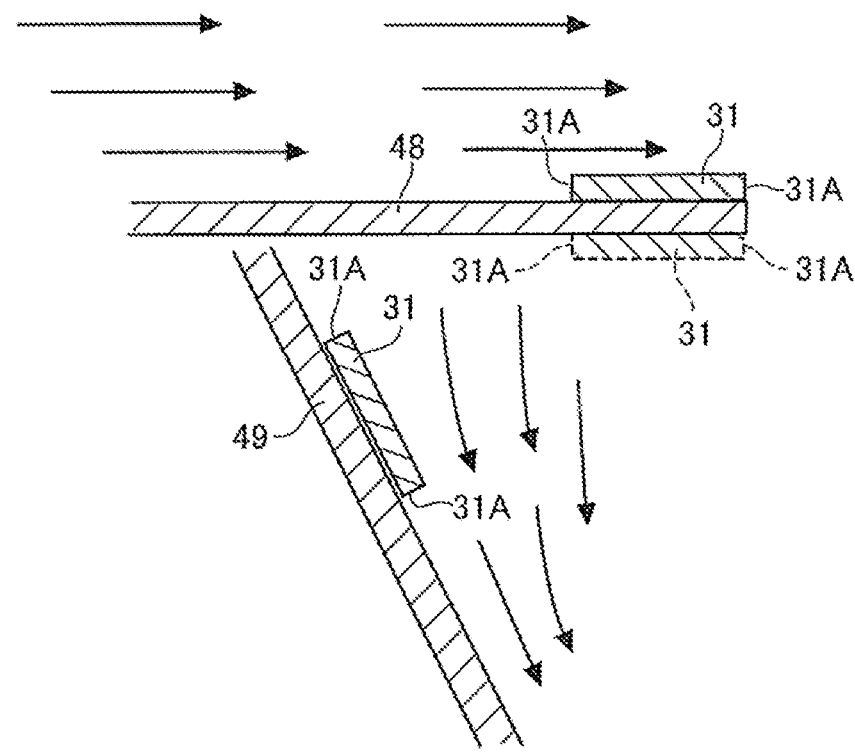

Moreover, FIG. 17 illustrate the position where the self-discharger 31 is disposed on a rear spoiler 48 and a rear back door 49 in detail. FIG. 17A illustrates a perspective view of the hatch back type vehicle 10, and FIG. 17B is a sectional view illustrating the position where the self-discharger 31 is attached to the rear spoiler 48 and the rear back door 49. In an example illustrated in FIG. 17, the self-discharger 31 is disposed on an upper surface of the rear spoiler 48, and positive (+) static electricity in the vicinity of the self-discharger 31 is discharged so as to lower the positive (+) potential. The self-discharger 31 may be disposed on a lower surface of the rear spoiler 48 as indicated by a broken line in FIG. 17B in accordance with various conditions so that the airflow is not disturbed.

Figure 18A:
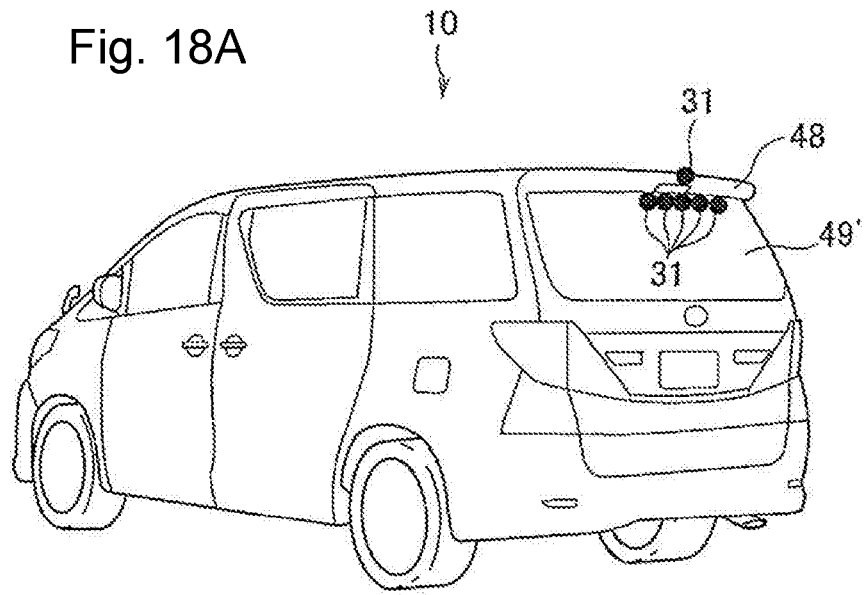
Figure 18B:
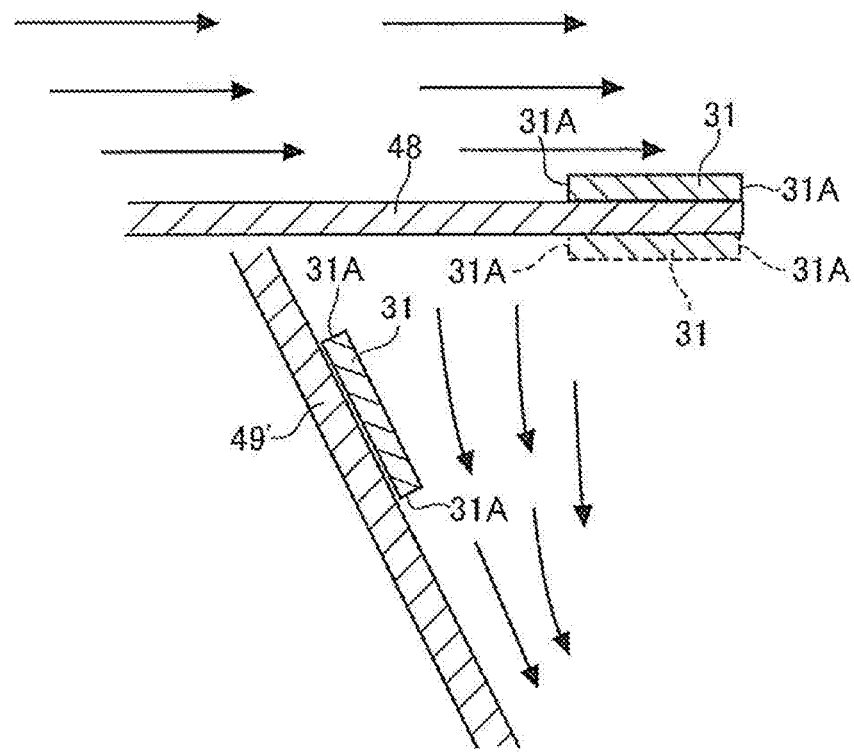

Moreover, in the example illustrated in FIG. 17, the rear back door 49 is formed by being suspended from a base portion of the rear spoiler 48 to the lower side. Therefore, the airflow flowing around the vehicle body 30 during running does not flow on the surface of the rear back door 49. However, when the airflow separates from the surface of the rear back door 49, it is likely that the airflow on the rear portion of the vehicle 10 is disturbed, and the airflow flowing around the vehicle body 30 during running is indirectly disturbed. Thus, in FIG. 17B, the self-discharger 31 is provided so that the positive (+) static electricity on the rear back door 49 is eliminated. More specifically, the self-discharger 31 is provided on the outer surface on the upper part of the rear back door 49. FIG. 18 illustrate perspective views of the one-box type vehicle 10, and the self-discharger 31 is provided similarly on the rear spoiler 48 and a rear back door glass 49' thereof. Specifically, as in the sectional view illustrated in FIG. 18B, the self-discharger 31 is provided on the upper surface or on the lower surface of the rear spoiler 48, and the self-discharger 31 is provided on the outer surface on an upper end of the rear back door glass 49'.

As described above, the self-discharger 31 is disposed on the center part in the width direction of the vehicle 10 so that the aerodynamic characteristics are not changed in the pitching direction of the vehicle 10 in some cases. Moreover, the position where the self-discharger 31 is disposed is not limited to the aforementioned position but as the self-discharger 31 provided on a front portion (f points) of the ceiling 37 in FIG. 12, for example, a plurality of the self-dischargers 31 may be provided at a certain interval along the direction of the airflow on the upper surface of the vehicle body 30. By providing the plurality of the self-dischargers 31 along the direction of the airflow, the separation of the air from the vehicle body 30 can be further suppressed.

Moreover, in the vehicle 10 illustrated in FIG. 12, the self-dischargers 31 are disposed on a front edge on a lower end portion (indicated as k points in FIG. 12) of the front bumper 14, a rear fuel tank (which will be described later) disposed below a floor of the vehicle body 30, a lower part (not shown) of a rear trunk below the floor of the vehicle body 30, a lower end portion (indicated as 1 points in FIG. 12) of the rear bumper 50 and the like. By disposing the self-dischargers 31 so that the positive (+) static electricity on the lower surface of the vehicle body 30 is discharged as above, the separation of the airflow on the lower surface of the vehicle body 30 from the lower surface of the vehicle body 30 can be suppressed. As a result, an increase in a pressure on the lower surface of the vehicle body 30 by the separation of the airflow from the lower surface of the vehicle body 30 and occurrence of Karman vortex on a rear side from the separation position can be suppressed. As a result, generation of a load pressing up the vehicle body 30 can be suppressed and thus, the lowering of the down force can be suppressed, and the grounding load between the front wheel 42 or the rear wheel 43 and the road surface can be maintained within the assumed range or to the proper value.

Figure 19:
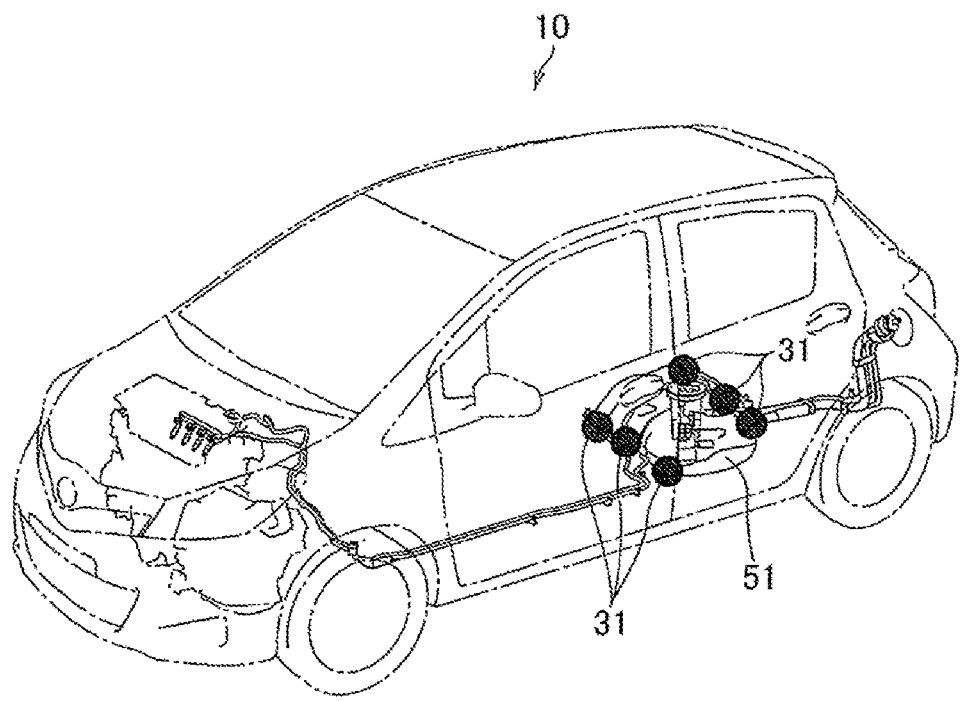
FIG. 19 is a view illustrating a position where the self-discharger is attached to a rear fuel tank.

FIG. 19 is a view illustrating a portion where the self-discharger 31 is disposed on the rear fuel tank 51 provided on the rear portion of the vehicle 10. If an undercover for reducing fluidity resistance of the airflow on the lower surface of the vehicle body 30 is not provided, the rear fuel tank 51 is exposed to the lower surface of the vehicle 10. Therefore, if the rear fuel tank 51 is charged, it is likely that the airflow on the surface of the rear fuel tank 51 separates, and a pressure on the lower surface of the vehicle body 30 increases. Thus, as illustrated in FIG. 19, the self-dischargers 31 are disposed on the front portion and the rear portion of the rear fuel tank 51 in the traveling direction of the vehicle 10.

Figure 20A:
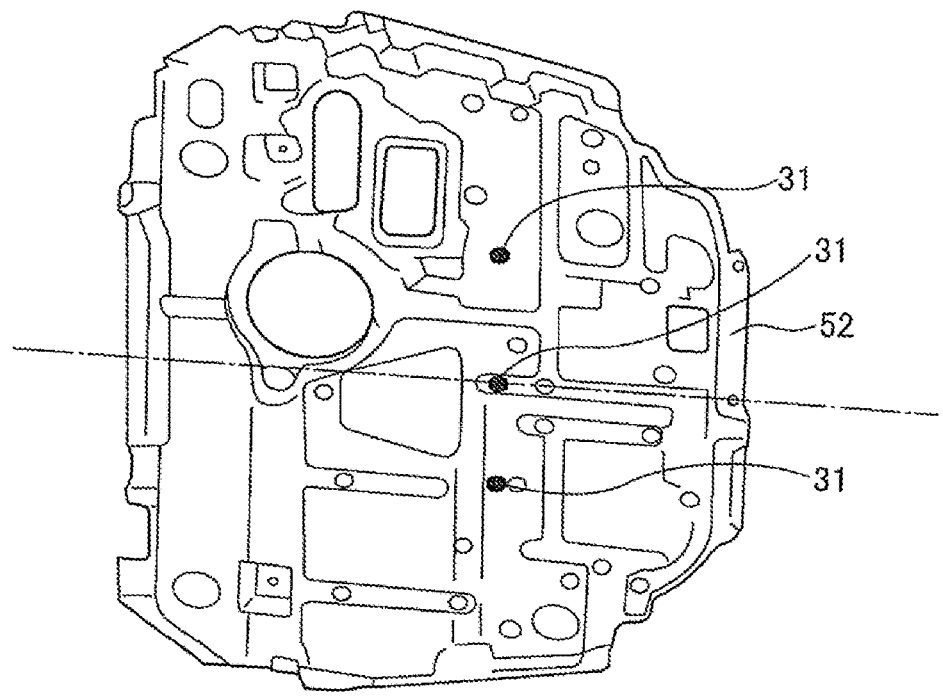
Figure 20B:
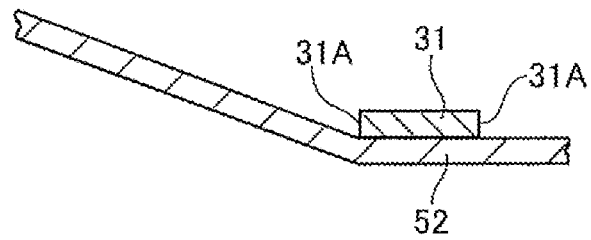

On the other hand, an undercover 52 as illustrated in FIG. 20 is provided in some cases in order to reduce fluidity resistance of the airflow on the lower surface of the vehicle body 30. FIG. 20 illustrate the front undercover 52 mounted on the lower part of the engine room, in which FIG. 20A is a plan view of the undercover 52 when seen from the lower side of the vehicle 10, and FIG. 20B is a sectional view illustrating a position where the self-discharger 31 is attached. Moreover, the left side in FIG. 20 illustrates the front of the vehicle 10, and a one-dot chain line indicates the center part of the vehicle 10 in the width direction. The front undercover 52 has its front side formed with upward inclination in the vertical direction so that it does not touch a step, when the vehicle 10 rides over the step or the like. Therefore, as illustrated in FIG. 20B, it is likely that the airflow flowing from the front of the undercover 52 separates at the bent point in the vertical direction of the undercover 52. Thus, in the example illustrated in FIG. 20, the self-discharger 31 is attached to the bent point or in the vicinity thereof so that the static electricity at the bent point is discharged. In the example illustrated in FIG. 20, the self-discharger 31 is attached to the rear surface on the side opposite to the outer surface. More specifically, the self-dischargers 31 are attached at the center part of the vehicle body 30 in the vehicle width direction and the positions equally on right and left with the center part between them, respectively. A distance between the self-discharger 31 attached at the center part and the self-dischargers 31 attached to right and left is set to approximately 150 to 200 mm in some cases.

Figure 21A:
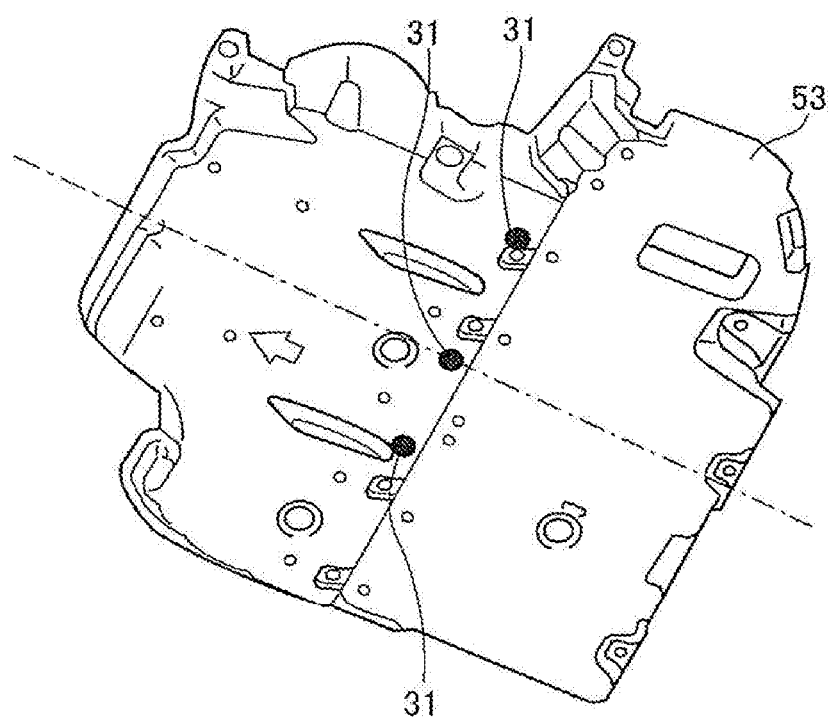
Figure 21B:
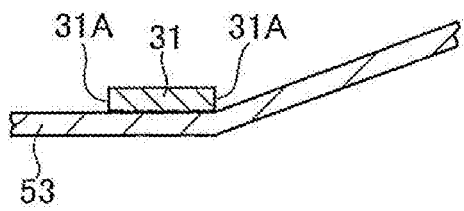

Moreover, when a rear diffuser 53 which controls the airflow on the rear of the vehicle body 30 through the lower surface of the vehicle body 30 is provided, the self-discharger 31 may be provided on the rear diffuser 53. FIG. 21 are views illustrating the rear diffuser 53, in which FIG. 21A is a view of the rear diffuser 53 when seen from the lower surface of the vehicle 10, and FIG. 21B is a sectional view illustrating a position where the self-discharger 31 is attached. The right side in FIG. 21 illustrates the rear of the vehicle 10, and the one-dot chain line indicates the center part of the vehicle 10 in the width direction. The rear diffuser 53 has its rear side formed with upward inclination in the vertical direction in order to increase the flow velocity of the airflow flowing to the rear side of the vehicle body 30 through the lower surface of the vehicle body 30. Therefore, as illustrated in FIG. 21B, it is likely that the airflow flowing from the front of the rear diffuser 53 toward the rear separates at the bent point of the rear diffuser 53. Thus, in the example illustrated in FIG. 21, the self-discharger 31 is attached to the bent point or in the vicinity thereof so that the static electricity at the bent point is discharged. In the example illustrated in FIG. 21, the self-discharger 31 is attached to the rear surface on the side opposite to the outer surface. More specifically, the self-dischargers 31 are attached at the center part of the vehicle body 30 in the vehicle width direction and the positions equally on right and left with the center part between them, respectively. A distance between the self-discharger 31 attached at the center part and the self-dischargers 31 attached to right and left is set to approximately 150 to 200 mm in some cases.

As described above, by discharging the positive (+) static electricity charged on the upper surface and the lower surface of the vehicle body 30 so as to lower the positive (+) potential, the separation of the airflow along those surfaces can be suppressed. Thus, the change in the aerodynamic characteristics of the vehicle body 30 in the pitching direction can be suppressed. As a result, since the change in the grounding load of the front wheel 42 or the rear wheel 43 can be suppressed, lowering of the acceleration performances, head-turning performances or steering stability can be suppressed.

Moreover, when the airflow along the both side surfaces of the vehicle body 30 separates, the aerodynamic characteristics in the rolling direction or in the yaw direction are changed. Thus, in the example illustrated in FIG. 12, the self-discharger 31 is disposed on any one pair of portions in portions left-right symmetric to the center part of the vehicle body 30 in the width direction. In the following, the position where the self-discharger 31 is disposed so that the change of the aerodynamic characteristics in the rolling direction or the yaw direction of the vehicle body 30 are suppressed and the action caused by disposition of the self-discharger 31 at the position will be described.

Examples of the left-right symmetric portions include a side glass 54, a door mirror 55, a grip portion 56 of a door handle, the front wheel 42, the rear wheel 43, a fender 57 and the like. Therefore, in the example illustrated in FIG. 12, the self-discharger 31 is disposed on a pair of portions such as a portion in a base portion of the door mirror 55 protruding the most to the front side of the vehicle body 30 (indicated as m points in the view), a position in the side glass 54 not included in a field of vision or more specifically, a space (indicated as n points in the view) between the side glass 54 and a belt molding 60 which prevents entry of rain water or the like into a front door 58 or a rear door 59, the grip portion 56 (indicated as o points in the view) of the door handle, a center position (indicated as p points in the view) of a tire wheel 61 of the front wheel 42, a side surface portion (indicated as q points in the view) of the front bumper 14 or the front fender 62 at the same height as the center position of the tire wheel 61 of the front wheel 42 and located on an upstream side of the airflow, a center position (indicated as r points in the view) of a tire wheel cap 63 embedded in the tire wheel 61 of the front wheel 42, a center position (indicated as s points in the view) of a tire wheel 64 of the rear wheel 43, the rear door 59 or a locker panel 65 (indicated as t points in the view) at the same height as the center position of the tire wheel 64 of the rear wheel 43 and located on the upstream side of the airflow, a center position (indicated as u points in the view) of a tire wheel cap 66 embedded in the tire wheel 64 of the rear wheel 43, a front part (indicated as v points in the view) of the front door 58 and the like.

Figure 22:
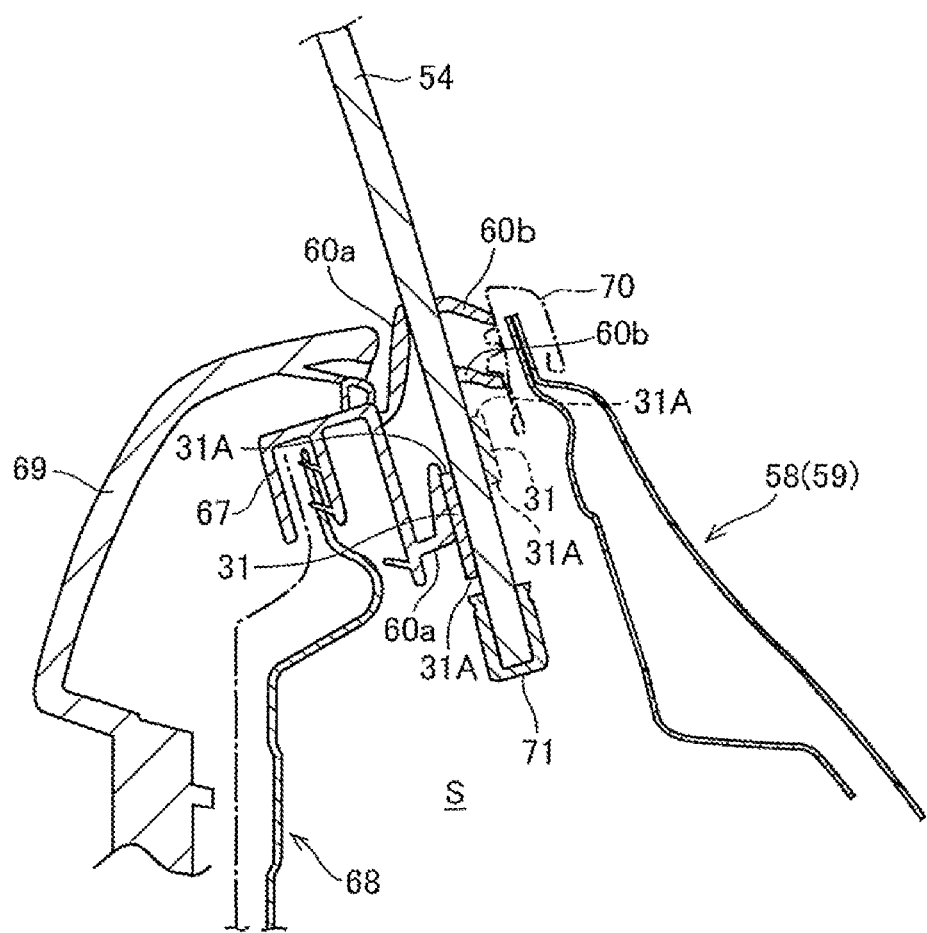
FIG. 22 is a sectional view illustrating a position where the self-discharger is attached to a lower part of a side glass so that the airflow around the vehicle body does not directly hit.

FIG. 22 is a sectional view illustrating an example in which the self-discharger 31 is disposed between the front door 58 or the rear door 59 and the belt molding 60. In the example illustrated in FIG. 22, a cabin-side belt molding 60a is connected to a frame 68 through a clip 67. To the clip 67, a door trim 69 is connected. Moreover, a vehicle-outside belt molding 60b is connected to the front door 58 or the rear door 59 connected to another frame, not shown, through a clip 70. The belt molding 60 is for preventing rain water or the like adhering to the side glass 54 from entering into a space between the door trim 69 and the front door 58 or the rear door 59 (hereinafter referred to as a door pocket S), and each of the belt moldings 60a and 60b is formed of a resin material such as rubber, and each of the belt moldings 60a and 60b is disposed so as to sandwich the side glass 54. In the example illustrated in FIG. 22, the two belt moldings 60a and 60b are connected to the clips 67 and 70, respectively, at a predetermined interval in the vertical direction.

Moreover, a lower end portion of the side glass 54 is held by a holding member 71 formed having a U-shaped sectional shape, and the holding member 71 is disposed in the door pocket S and is constituted so as to be vertically moved by a motor, not shown. Therefore, by lowering the holding member 71, the side glass 54 can be accommodated in the door pocket S.

Then, the self-discharger 31 discharging the positive (+) static electricity of the side glass 54 is attached to the lower part of the side glass 54. Specifically, the self-discharger 31 is attached to the side glass 54 so that the self-discharger 31 is located in the door pocket S, even if the side glass 54 is raised the most. Moreover, an upper end portion of the belt molding 60 protrudes from the door trim 69 and the front door 58 or the rear door 59, appears on the appearance of the vehicle 10 and is exposed to the airflow around the vehicle body. Therefore, the positive (+) static electricity of the belt molding 60 is neutralized and eliminated in some cases. Thus, in the example illustrated in FIG. 22, the position where the self-discharger 31 is attached to the side glass 54 is determined so that the cabin-side belt molding 60a on the lower side and the self-discharger 31 are in contact when the side glass 54 is raised the most. The self-discharger 31 may be attached to the cabin-side belt molding 60a on the lower side so that the side glass 54 and the cabin-side belt molding 60a are in contact at all times when the side glass 54 is vertically moved.

As described above, by attaching the self-discharger 31 to the side glass 54 or the cabin-side belt molding 60a, the positive (+) static electricity of the side glass 54 and the belt molding 60 can be discharged and thus, the separation of the airflow along the outer surface of the side glass 54 can be suppressed. Moreover, since the self-discharger 31 is provided in the door pocket S, the positive (+) static electricity of the side glass 54 and the belt molding 60 can be discharged to the air in the door pocket S. In the example illustrated in FIG. 22, the example in which the self-discharger 31 is attached to the cabin side in the side glass 54 is illustrated, but the self-discharger 31 may be attached to the side outside of the vehicle as indicated by a broken line in FIG. 22.

Moreover, FIG. 22 illustrates constitution in which the positive (+) static electricity of the belt molding 60 and the side glass 54 provided on a lower edge portion of a window frame formed on the front door 58 or the rear door 59 is discharged, but the self-discharger 31 may be attached to the inner side of the belt molding 60 provided on right and left edge portions as illustrated in FIG. 12.

Figure 23:
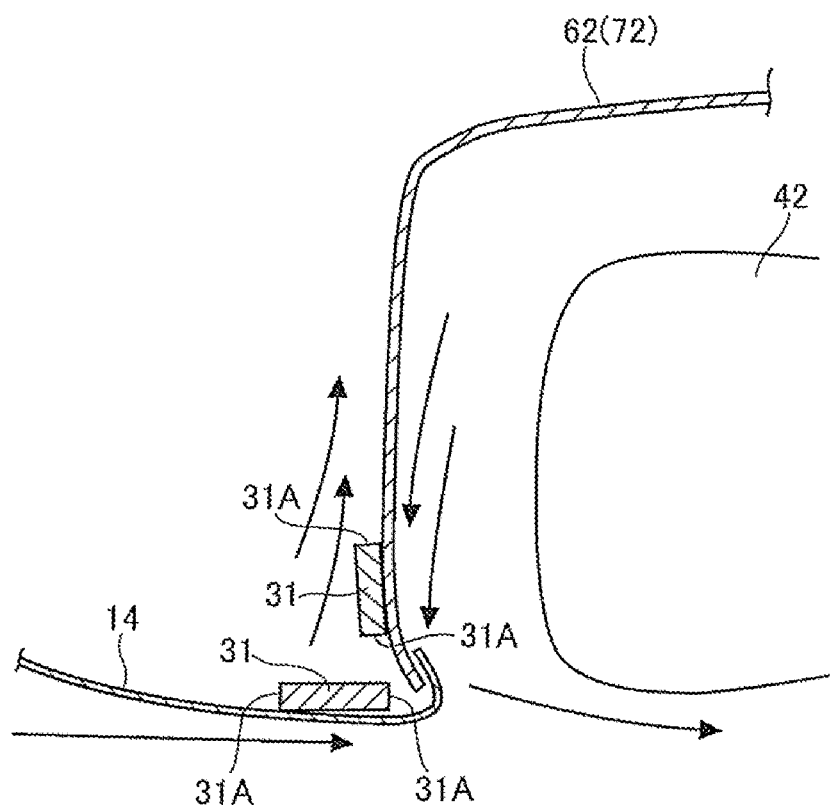
FIG. 23 is a sectional view illustrating an example in which the self-discharger is attached to a side end of a front liner and a rear end of a front bumper where the airflow around the vehicle body separates so that the airflow around the vehicle body does not directly hit.

FIG. 23 illustrates an example in which the self-discharger 31 is attached to the bumper cover (front bumper) 14 and a front fender 62. The lower side in FIG. 23 is the left side in the vehicle width direction, and the left side in FIG. 23 is the front of the vehicle 10. As illustrated in FIG. 23, the airflow flowing along the side surface of the front bumper 14 continuously flows along the front wheel 42. By means of the flow of the airflow as above, a position between the front fender 62 and the front wheel 42 of the vehicle 10 in the longitudinal direction and on the side surface of the front bumper 14 in the vehicle width direction becomes a negative pressure. Thus, the air is suctioned to the outside in the vehicle width direction from a fender house, and the air is discharged from an inside of the fender house, whereby fluidity is kept favorable. Therefore, if the airflow separates at an unintended position from the side surface of the front bumper 14, it is likely that the air is not easily suctioned to the outside in the vehicle width direction from the fender house.

Thus, in the example illustrated in FIG. 23, the self-discharger 31 is attached to the side surface of the front bumper 14 and on the surface on the side opposite to the outer surface, and the self-discharger 31 is attached to the front fender 62 or more specifically, on the surface on the side opposite to the surface on the fender house side in a fender liner 72. Moreover, each of the self-dischargers 31 is disposed at the same height as the center part of the front wheel 42 in the vertical direction in some cases. By providing the self-dischargers 31 as above, the separation of the airflow along the side surface of the front bumper 14 at an unintended position in the front bumper 14 can be suppressed. That is, occurrence of such a situation that the air taken into the fender house in order to cool the front wheel 42, or more specifically, in order to cool a brake causing a braking force to act on the front wheel 42 is not suctioned easily to the outside in the vehicle width direction can be suppressed. That is, lowering of the flow velocity of the airflow in the fender house can be suppressed.

Moreover, the grip portion 56 of the door handle is formed hollow due to convenience of manufacture thereof in some cases. When the grip portion 56 of the door handle is formed hollow as above, the self-discharger 31 is disposed in a hollow portion thereof in some cases. Alternatively, if the grip portion 56 of the door handle is formed having a U-shaped sectional shape, or in other words, if the grip portion 56 of the door handle has a slit formed, the self-discharger 31 is disposed in the slit in some cases.

As described above, by disposing the self-dischargers 31 on any one pair of portions in left-right symmetric portions, the separation of the airflow from both side surfaces of the vehicle body 30 can be suppressed. More specifically, the change in the aerodynamic characteristics in the rolling direction or in the yaw direction caused by the separation of the airflow from either one of the side surfaces can be suppressed. Particularly, the change in the aerodynamic characteristics in the rolling direction or in the yaw direction caused by the separation of the airflow from the inner side surface in a turning direction during turning can be suppressed. As a result, lowering of the running performances such as manipulation stability can be suppressed.

Figure 24:
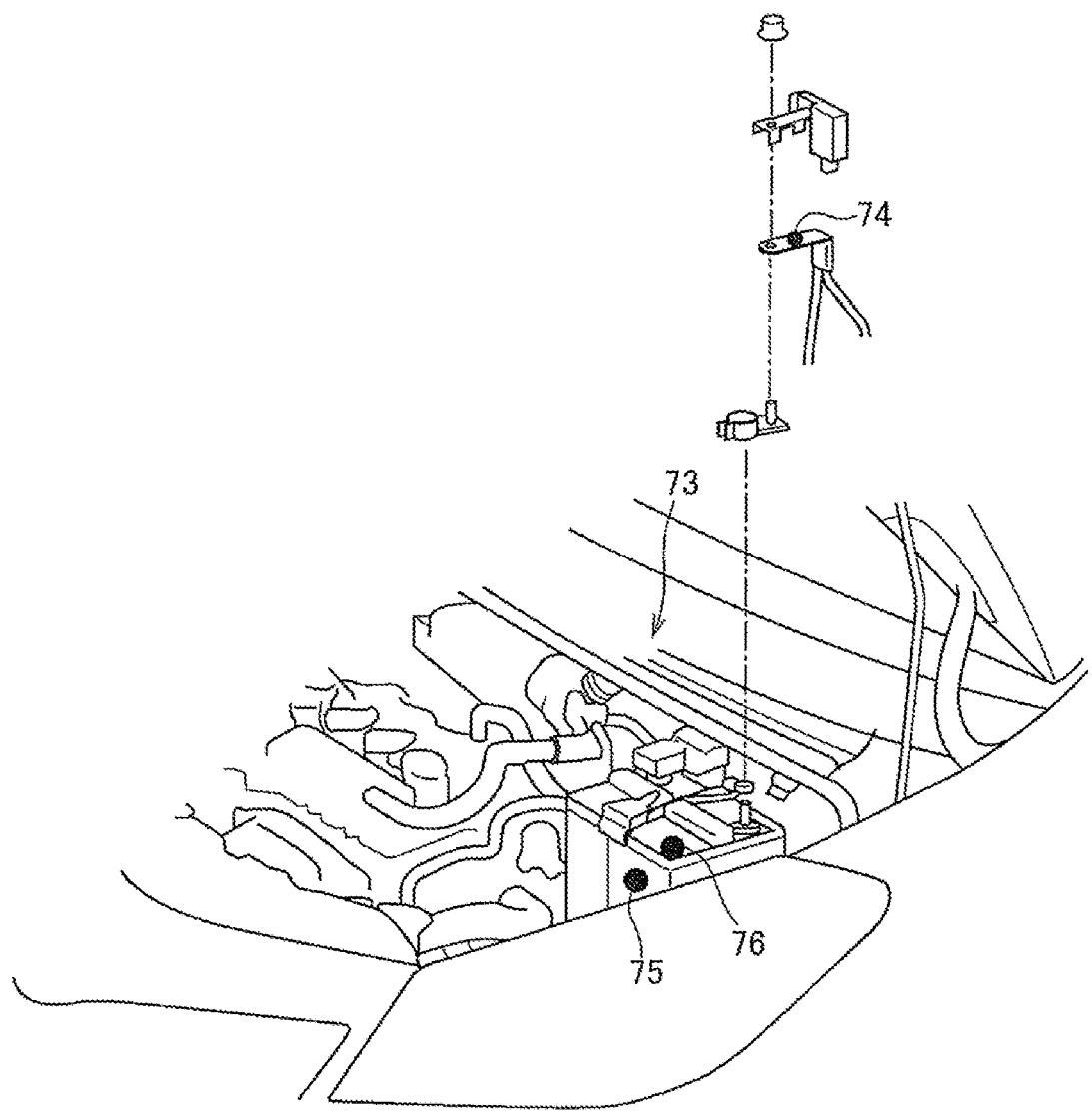
FIG. 24 is a perspective view illustrating a position where the self-discharger is attached to a negative terminal grounded to the vehicle body in a battery arranged in the engine room and a case of the battery.

Moreover, each member is fixed to the frame, and the frame is electrically connected to an earth portion (minus terminal portion) of the battery. Therefore, by lowering the potential of the frame, the potential of the positive (+) static electricity charging on each portion of the vehicle body 30 can be lowered. Thus, in the example illustrated in FIG. 24, the self-discharger 31 is constituted to be attached to the minus terminal portion of a battery 73 corresponding to the grounding portion in the present disclosure or more specifically, on a minus terminal 74 so as to lower a negative (−) potential of the minus terminal 74. The self-discharger 31 may be attached to a case portion 75 or a lid portion 76 of the battery 73. Usually, the battery 73 is provided in the engine room, and an outside air is taken into the engine room and is made to flow so as to cool the engine. Therefore, the electricity eliminating action caused by generation of the corona discharge from the self-discharger 31 as described above can be exerted by generation of the corona discharge from the self-discharger 31.

In the following, the exemplary embodiment will be described by using an example, but the exemplary embodiment is not limited by the following example.

In the example, an ion liquid (product name: EMI-TF by Toyo Gosei Co., Ltd.) as the transparent conductive material was applied for 5 cm from end portions on the both sides of the windshield 36 in the vehicle width direction. Subsequently, a rectangular conductive film as illustrated in FIG. 7A was disposed along the frames on the both sides of the windshield as illustrated in FIG. 1. At this time, by disposing the conductive film so as to overlap the windshield by several millimeters, the conductive film and the ion liquid are brought into direct contact. The vehicle prepared as above was evaluated for the manipulation stability by examining a steering speed (deg/s$^2$) and a yaw angle acceleration (deg/s$^2$).

Moreover, as a comparative example 1, the vehicle in which the conductive film was disposed along the frames on the both sides of the windshield 36 without applying the transparent conductive material was evaluated for the manipulation stability. Moreover, as a comparative example 2, the vehicle in which the transparent conductive material and the conductive film were not disposed was evaluated for the manipulation stability.

Figure 25:
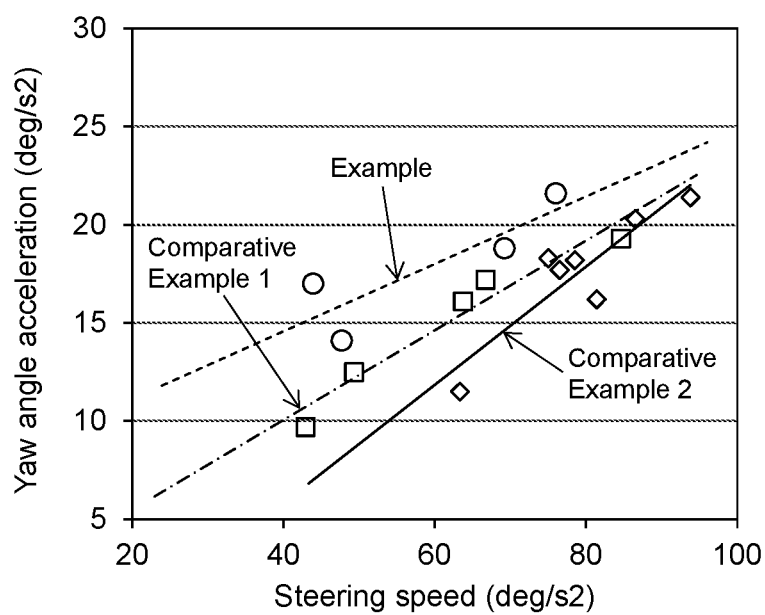
FIG. 25 is a graph illustrating a result of evaluation of manipulation stability for the vehicle made in the exemplary embodiment.

The result is illustrated in FIG. 25. From FIG. 25, it is known that the yaw angle acceleration is improved in the example, and the manipulation stability is excellent.

An exemplary embodiment has been described in detail, but the specific constitution is not limited to this exemplary embodiment, and design changes within a range not departing from the gist of the present disclosure are included in the present disclosure.

DESCRIPTION OF SYMBOLS

10 Vehicle
12 Self-discharging static eliminator, charging suppression member or conductive film
12A Corner part
14 Bumper cover
16 Door mirror
18 Head lamp
30 Vehicle body
31 Self-discharger (self-discharging static eliminator)
35 Engine hood
36 Windshield
37 Ceiling
38 Roof spoiler
39 Wiper
42 Front wheel
43 Rear wheel
45 Indoor roof liner
46 Rear glass
47 Luggage door
48 Rear spoiler
49 Rear back door
49' Rear back door glass
50 Rear bumper
51 Rear fuel tank
52 Undercover (front undercover)
53 Rear diffuser
54 Side glass
55 Door mirror
56 Grip portion of door handle
57 Fender
58 Front door
59 Rear door
60 Belt molding
61, 64 Tire wheel
62 Front fender
63, 66 Tire wheel cap
65 Locker panel
72 Fender liner
73 Battery
74 Minus terminal
75 Case portion
76 Lid portion
100 Transparent conductive material

What is claimed is:

1. A vehicle comprising:
a self-discharging static eliminator which neutralizes and eliminates positive charges generated on a vehicle body by self-discharging which generates negative air ions; and
a transparent conductive material, wherein
the self-discharging static eliminator and the transparent conductive material are electrically continuous, wherein
the self-discharging static eliminator and the transparent conductive material are electrically continuous by being in indirect contact through a conductive member.

2. The vehicle according to claim 1, wherein
the transparent conductive material is disposed at least on a part of a portion which can be visually recognized from an outside of the vehicle.

3. The vehicle according to claim 2, wherein
the transparent conductive material is disposed at least on a part of an outer surface of the vehicle.

4. The vehicle according to claim 1, wherein
the transparent conductive material is disposed on a surface of an insulating member constituting a part of the vehicle.

5. The vehicle according to claim 4, wherein
the insulating member is a glass member.

6. The vehicle according to claim 5, wherein
the glass member is a window glass or a glass for light.

7. The vehicle according to claim 4, wherein
the insulating member is a resin member.

8. The vehicle according to claim 1, wherein
the self-discharging static eliminator is disposed at least on a part of a portion which cannot be visually recognized from the outside of the vehicle.

9. The vehicle according to claim 1, wherein
the self-discharging static eliminator neutralizes and eliminates, by self-discharging, positive charges in at least one of specific portions having a separation shape where an airflow positively charged and flowing around the vehicle body during running begins to change from a flow along a surface of the vehicle body to a flow separated from the surface of the vehicle body.

10. The vehicle according to claim 1, wherein
the self-discharging static eliminator is a charging suppression member including a conductive metal material having a corner part which causes the self-discharging to be generated.

11. The vehicle according to claim 1, wherein
the transparent conductive material is an ion liquid, a conductive polymer or a metal organic framework.

12. The vehicle according to claim 1, wherein
the transparent conductive material is an ion liquid.

13. The vehicle according to claim 1, wherein
the transparent conductive material is a conductive polymer.

14. The vehicle according to claim 1, wherein
the transparent conductive material is a metal organic framework.

* * * * *